(12) United States Patent
Bickham et al.

(10) Patent No.: US 6,757,468 B2
(45) Date of Patent: Jun. 29, 2004

(54) DISPERSION COMPENSATION OPTICAL FIBER AND OPTICAL TRANSMISSION LINE USING SAME

(75) Inventors: Scott R. Bickham, Corning, NY (US); Denis Donlagic, Painted Post, NY (US)

(73) Assignee: Corning Incorporated, Corning, NY (US)

(*) Notice: Subject to any disclaimer, the term of this patent is extended or adjusted under 35 U.S.C. 154(b) by 240 days.

(21) Appl. No.: 10/098,889

(22) Filed: Mar. 14, 2002

(65) Prior Publication Data

US 2003/0174987 A1 Sep. 18, 2003

(51) Int. Cl.[7] .............................. G02B 6/02; G02B 6/16; G02B 6/20; G02B 6/22
(52) U.S. Cl. ....................... 385/127; 385/123; 385/125; 385/126
(58) Field of Search ................................. 385/123–128

(56) References Cited

U.S. PATENT DOCUMENTS

| | | | |
|---|---|---|---|
| 5,448,674 A | 9/1995 | Vengsarkar et al. | 385/123 |
| 5,555,340 A | 9/1996 | Onishi et al. | 385/127 |
| 5,995,695 A | 11/1999 | Aikawa et al. | 385/123 |
| 6,263,138 B1 | 7/2001 | Sillard et al. | 385/123 |
| 6,400,877 B1 | 6/2002 | Kato et al. | 385/123 |
| 2001/0033724 A1 | 10/2001 | Kato et al. | 385/123 |
| 2001/0055436 A1 | 12/2001 | Sugizaki et al. | 385/10 |
| 2002/0018631 A1 | 2/2002 | Arai et al. | 385/127 |

FOREIGN PATENT DOCUMENTS

| | | | |
|---|---|---|---|
| DE | 1 130 428 | 3/2000 | G02B/6/16 |

OTHER PUBLICATIONS

Alcatel 6912, TeraLight™ Ultra Fiber, Jan. 2002.
Alcatel 6911, TeraLight™ Metro Fiber, Jan. 2002.
Corning® PureForm™ DCM® Modules for LEAF® Fiber, Optimized Dispersion Slope Compensation for LEAF Fiber, Mar. 2001.
OFS Fitel, EHSDK–C Dispersion Compensating Modules for NZDF (C–Band), Sep. 2001.
OFS Fitel, Dispersion Compensating Modules Overview, Sep. 2001.
Belov et al., "Single–Mode Dispersion Compensator for 1.31/1.55– um long haul communication lines", OFC/IOOC '93 Technical Digest, pp. 203–204.
Bromage et al., "S–Band all–Raman amplifiers for 40 ×10 Gb/s transmission over 6×100 km of non–zero dispersion fiber", OFC 2001, Mar. 22, 2001, PD4–1,2,3.
Hirano et al., "Dispersion Compensating Fiber over 140 nm–Bandwidth", ECOC 2001, Sep. 30, 2001.
Kumano et al., "Novel NZ–DSF with Ultra–Low Dispersion Slope Lower than 0.020 ps/nm$^2$/km", ECOC 2001, Sep. 30, 2001.

*Primary Examiner*—John D. Lee
*Assistant Examiner*—Tina M Lin
(74) *Attorney, Agent, or Firm*—Randall S. Wayland

(57) ABSTRACT

A Dispersion Compensation (DC) fiber and transmission line including the same. The DC fiber has a refractive index profile having a central core with a core delta ($\Delta 1$) value greater than 1.5%, a moat surrounding the central core having a moat delta ($\Delta 2$) value less negative than −0.65%, and a ring surrounding the moat having a positive ring delta ($\Delta 3$). The DC fiber's refractive index profile is selected to provide total dispersion less than −87 and greater than −167 ps/nm/km; dispersion slope more negative than −0.30 ps/nm$^2$/km; and kappa of greater than 151 and less than 244 nm, all at 1550 nm. The DC fiber, when used in transmission lines, may provide low average residual dispersions across the C, L, C+L and S bands when such lines include transmission fibers with total dispersion between 4 and 10 ps/nm/km, and a positive dispersion slopes of less than 0.045 ps/nm$^2$/km at 1550 nm. Further embodiments are described that include Raman pumping.

97 Claims, 24 Drawing Sheets

K210-3

K177-5

K184-6

DISPERSION COMPENSATION OPTICAL FIBER AND OPTICAL TRANSMISSION LINE USING SAME

BACKGROUND OF THE INVENTION

1. Field of the Invention

The present invention relates generally to optical fiber, and more particularly to dispersion compensation fiber and transmission lines including combinations of transmission fiber and dispersion compensation fiber.

2. Technical Background

Higher data rates and wider bandwidth systems are becoming needed for the telecommunications industry. Thus, the search for high performance optical fibers designed for long distance, high bit rate telecommunications that can operate over broad bandwidths has intensified. These high data rates and broad bandwidths, however, have penalties associated with them. In particular, dispersion is a significant problem for such systems. More specifically, positive dispersion builds as a function of the length of the high data rate transmission fiber. Dispersion Compensating (DC) fibers included in cable or in Dispersion Compensation Modules (DCM's) have been designed that compensate for such dispersion. These fibers generally have negative dispersion slope and negative total dispersion, with the dispersion having a large negative value such that a short length of the DC fiber compensates for the positive dispersion and positive slope of the longer transmission portion. For C- and L-band operation between 1525 nm and 1625 nm, the bend performance (both macro-bending and micro-bending) and other properties, such as dispersion and kappa linearity (kappa being the ratio of total dispersion divided by dispersion slope at a specific wavelength) of the DC fiber are very important. This is particularly true in DC fibers that will be included in a wound spool of a DCM, but also for cabled DC fiber utilized in dispersion managed systems.

Thus, there is a need for a DC fiber which: (1) exhibits fairly linear properties over the C- and L-bands in a wavelength range (1525 nm to 1625 nm); (2) retains the usual high performance optical fiber characteristics such as high strength, low attenuation and acceptable resistance to micro- and macro-bend induced loss, and (3) is particularly effective at compensation for the dispersion of low slope transmission fibers across the C, L and C+L-bands with low average residual dispersion.

SUMMARY OF THE INVENTION

Definitions

The following definitions are used herein.

Refractive Index Profile—The refractive index profile is the relationship between refractive index and optical fiber radius for the DC fiber.

Segmented Core—A segmented core is one that has multiple segments in the core, such as a first and a second segment (a central core and a moat, for example). Each core segment has a respective refractive index profile and maximum and minimum refractive index therein.

Radii—The radii of the segments of the core 21 are defined in terms of the beginning and end points of the segments of the refractive index profile of the fiber 20. FIG. 3 illustrates the definitions of radii R1, R2, and R3 used herein. The same dimension conventions apply for defining the radii in FIGS. 4–15, 28–30 and 43 as well. The radius R1 of the central core 22 is the length that extends from the DC fiber's centerline CL to the point at which the refractive index profile crosses the relative refractive index zero 23 as measured relative to the cladding 28. The outer radius R2 of the moat segment 24 extends from the centerline CL to the radius point at which the outer edge of the moat crosses the refractive index zero 23, as measured relative to the cladding 28. The radius R3 is measured to the radius point at which a tangent to the outer edge 27 of the ring 26 meets the refractive index zero 23, as measured relative to the cladding 28. The width of the ring 26 is defined as the distance from R3 to the bisecting point of a tangent of the inward portion 29 of the ring with the refractive index zero 23, as measured relative to the cladding 28.

Effective Area—The effective area is defined as:

$$A_{eff} = 2\pi (\int E^2 r\, dr)^2 / (\int E^4 r\, dr),$$

where the integration limits are 0 to $\infty$, and E is the electric field associated with the propagated light as measured at 1550 nm.

$\Delta\%$ or Delta (%)—The term, $\Delta\%$ or Delta (%), represents a relative measure of refractive index defined by the equation, $$\Delta\% = 100(n_i^2 - n_c^2)/2n_i^2$$

where $n_i$ is the maximum refractive index (highest positive or lowest negative) in the respective region i (e.g., 22, 24, 26), unless otherwise specified, and $n_c$ is the refractive index of the cladding (e.g., 28) unless otherwise specified.

$\alpha$-profile—The term alpha profile, $\alpha$-profile refers to a refractive index profile, expressed in terms of $\Delta(b)\%$, where b is radius, which follows the equation, $$\Delta(b)\% = [\Delta(b_o)(1-[|b-b_o|/(b_f-b_o)]^\alpha)]100$$

where $b_o$ is the maximum point of the profile and $b_l$ is the point at which $\Delta(b)\%$ is zero and b is in the range $b_i \leq b \leq b_f$, where $\Delta\%$ is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. In the model, in order to bring about a smooth joining of the $\alpha$-profile with the profile of the adjacent profile segment, the equation is rewritten as;

$$\Delta(b)\% = [\Delta(b_a) + [\Delta(b_o) - \Delta(b_a)]\{(1-[|b-b_o|/(b_f-b_o)]^\alpha\}]100,$$

where $b_a$ is the first point of the adjacent segment.

Pin array macro-bending test—This test is used to compare relative resistance of optical fibers to macro-bending. To perform this test, attenuation loss is measured when the optical fiber is arranged such that no induced bending loss occurs. This optical fiber is then woven about the pin array and attenuation again measured. The loss induced by bending is the difference between the two attenuation measurements in dB. The pin array is a set of ten cylindrical pins arranged in a single row and held in a fixed vertical position on a flat surface. The pin spacing is 5 mm, center-to-center. The pin diameter is 0.67 mm. The optical fiber is caused to pass on opposite sides of adjacent pins. During testing, the optical fiber is placed under a tension sufficient to make the optical fiber conform to a portion of the periphery of the pins.

Lateral load test—Another bend test referenced herein is the lateral load test that provides a measure of the micro-bending resistance of the optical fiber. In this test, a prescribed length of optical fiber is placed between two flat plates. A #70 wire mesh is attached to one of the plates. A known length of optical fiber is sandwiched between the plates and the reference attenuation is measured while the plates are pressed together with a force of 30 newtons. A 70 newton force is then applied to the plates and the increase in attenuation in dB/m is measured. This increase in attenuation is the lateral load attenuation of the optical fiber.

SUMMARY

In accordance with embodiments of the present invention, a dispersion compensation fiber is provided having a refractive index profile including a core having a central core with a core delta ($\Delta 1$) having a value greater than 1.5%, a moat surrounding the central core having a moat delta ($\Delta 2$) having a value less negative than −0.65%, and a ring surrounding the moat having a positive ring delta ($\Delta 3$). The refractive index profile of the DC fiber is selected to provide a total dispersion less than −87 and greater than −167 ps/nm/km at 1550 nm; a dispersion slope more negative than −0.30 ps/nm$^2$/km at 1550 nm; and a kappa value defined as the total dispersion at 1550 nm divided by the dispersion slope at 1550 nm of greater than 151 and less than 244 nm, and a core-moat ratio, defined as a radius (R1) to the outer edge of the central core divided by a radius (R2) to the outer edge of the moat, of greater than 0.31.

In accordance with other embodiments of the invention, a dispersion compensation fiber is provided comprising a refractive index profile having a core including a central core with a core delta ($\Delta 1$) of less than 2.2%, a moat surrounding the central core having a moat delta ($\Delta 2$) less negative than −0.65%, and a ring surrounding the moat having a positive ring delta ($\Delta 3$). The refractive index profile of the DC fiber is selected to provide a total dispersion less than −96 and greater than −130 ps/nm/km at 1550 nm; a dispersion slope more negative than −0.35 and less negative than −0.85 ps/nm$^2$/km at 1550 nm; and a kappa of greater than 163 and less than 219 nm.

In another embodiment of the invention, an optical transmission line is provided. The transmission line includes a transmission fiber with a total dispersion between 4 and 10 ps/nm/km at a wavelength of 1550 nm, and a positive dispersion slope of less than 0.038 ps/nm$^2$/km at a wavelength of 1550 nm, and a dispersion compensation fiber optically connected to the transmission fiber, the dispersion compensation fiber having a refractive index profile including a core with a central core having a core delta ($\Delta 1$) having a value greater than 1.5%, a moat surrounding the central core having a moat delta ($\Delta 2$) having a value less negative than −0.65%, and a ring surrounding the moat having a positive ring delta ($\Delta 3$), the refractive index profile of the dispersion compensation fiber selected to provide a total dispersion less than −87 and greater than −167 ps/nm/km at 1550 nm, a dispersion slope more negative than −0.30 ps/nm$^2$/km at 1550 nm; kappa of greater than 151 and less than 244 nm, and a core-moat ratio, defined as a radius (R1) to the outer edge of the central core divided by a radius (R2) to the outer edge of the moat, of greater than 0.31.

In accordance with another embodiment, an optical transmission line is provided comprising a transmission fiber having a total dispersion between 4 and 10 ps/nm/km at a wavelength of 1550 nm, and a positive dispersion slope of less than 0.045 ps/nm$^2$/km at a wavelength of 1550 nm, a dispersion compensation fiber having a length between 4 and 8 km optically coupled to the transmission fiber including a refractive index profile with a core having a central core having a core delta ($\Delta 1$) of less than 2.2%, a moat surrounding the central core having a moat delta ($\Delta 2$) less negative than −0.65%, and a ring surrounding the moat having a positive ring delta ($\Delta 3$), the refractive index profile of the dispersion compensation fiber selected to provide total dispersion less than −96 and greater than −130 ps/nm/km at 1550 nm; dispersion slope more negative than −0.35 and less negative than −0.85 ps/nm$^2$/km at 1550 nm; and kappa, defined as the total dispersion at 1550 nm divided by the dispersion slope at 1550 nm, of greater than 163 and less than 219 nm, and a Raman pump optically coupled to the dispersion compensating fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
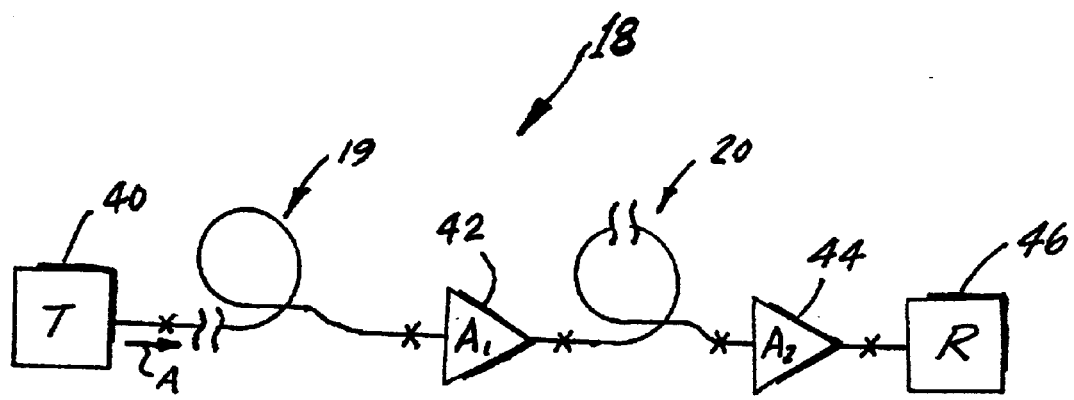
FIG. 1 is a block depiction of a transmission line including a DC fiber in accordance with the present invention.

Reference will now be made in detail to the present preferred embodiment(s) of the invention, examples of which is/are illustrated in the accompanying drawings. Whenever possible, the same reference numerals will be used throughout the drawings to refer to the same or like parts.

By way of example, and not to be considered limiting, an optical transmission line 18 is illustrated in FIG. 1 having a length (preferably about 100 km) of a transmission fiber 19 such as a NZDSF and a DC fiber 20 in accordance with embodiments of the invention. A preferred transmission fiber 19 is described in detail in U.S. Patent Application Serial No. 60/358,539 filed Feb. 15, 2002 entitled "Low Slope Dispersion Shifted Optical Fiber" which is hereby incorporated by reference herein. The transmission fiber 19 has a positive dispersion of between about 4 and 10 ps/nm/km at 1550 nm and a positive dispersion slope of less than about 0.045 ps/nm$^2$/km at 1550 nm. Kappa of the NZDSF transmission fiber 19 is preferably between about 147 and 260 nm or higher nm at 1550 nm. Kappa is defined herein as the total dispersion of the fiber at 1550 nm divided by the dispersion slope of the fiber at 1550 nm. In the transmission line 19, the DC fiber 20 compensates for the built up dispersion resulting from passing a light signal through the transmission fiber 19 (as indicated by arrow A). It should be recognized that although the system is described herein as being unidirectional, that transmission lines including the DC fiber 20 described herein may have signals passing in both directions.

In representative transmission lines 18, 118, 218, as is described with reference to FIGS. 1, 27 and 42, the built up dispersion of the transmission fiber 19 (e.g., NZDSF) is compensated for by a shorter length of DC fiber 20 of between about 4 to 8 km; more preferably between 4.6 and 7.2 km in accordance with the invention. This length enables the utilization of the DC fiber 20 as the gain medium and the utilization of a Raman pump 69 (see FIG. 42). The transmission line 218 of FIG. 42 preferably includes an optical coupler 58 for reverse coupling the Raman pump 60 to the DC fiber 20. The Raman amplified transmission line 218 may include an Erbium Doped Fiber Amplifier (EDFA) 42 and other conventional components such as a transmitter 40 and receiver 46. Optionally, the amplifier 42 may be a forward or backward propagating Raman pump.

Figure 27:
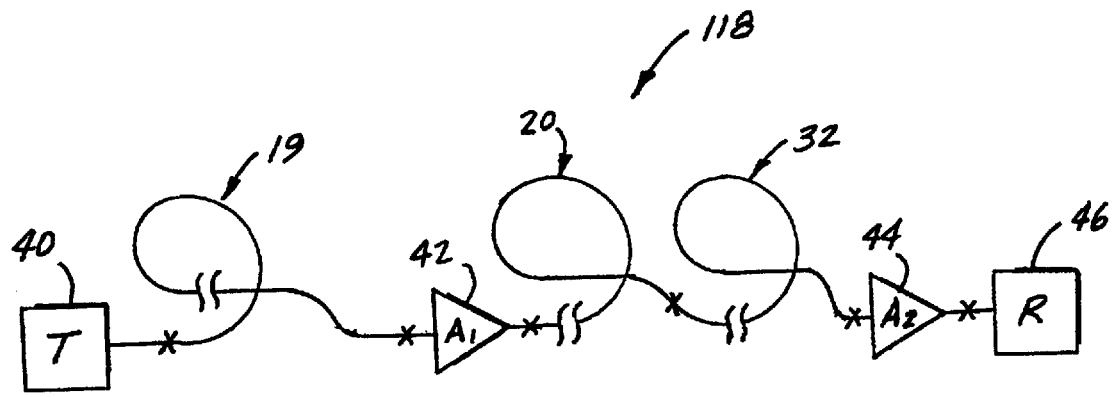
FIG. 27 is a block diagram of a transmission line including a DC fiber and a trim fiber in accordance with the present invention.
Figure 42:
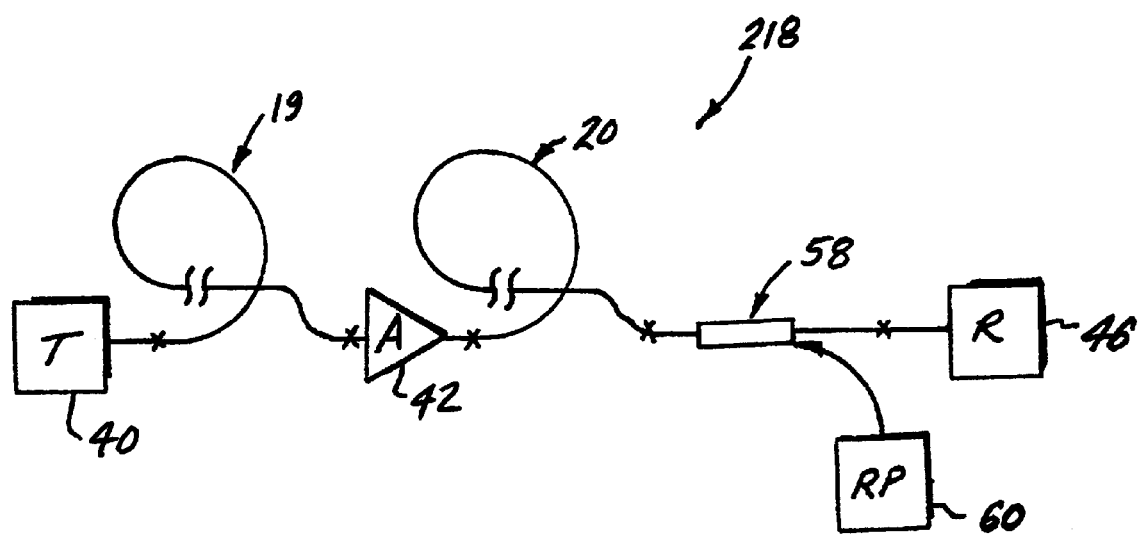
FIG. 42 is a block diagram of a transmission line including a transmission fiber, dispersion compensating fiber and Raman pump in accordance with another embodiment of the present invention.

In the examples of FIGS. 1, 27 and 42 herein, the DC fibers 20 have a dispersion of between about −87 and −167 ps/nm/km at 1550 nm and a dispersion slope more negative than −0.3 ps/nm$^2$/km at 1550 nm. The DC fibers 20 preferably have a kappa of greater than 151 and less than 244 nm at 1550 nm. The DC fibers 20 have segmented core structures, as are illustrated in FIGS. 2–15, 28–30 and 43.

One embodiment of optical transmission line 218 is shown in FIG. 42 that has excellent application to high bit rate, broadband systems includes a transmission fiber 19, a DC fiber 20 and a Raman pump 60. The transmission fiber has a total dispersion between 4 and 10 ps/nm/km at a wavelength of 1550 nm, and a positive dispersion slope of less than 0.045 ps/nm$^2$/km at a wavelength of 1550 nm. The DC fiber 20 has a length between 4 and 8 km (more preferably between 4.6 and 7.2 km) optically coupled to the transmission fiber 19. This length optimizes the Raman pumping efficiency. The DC fiber 20 as shown in FIGS. 3–15 and 28–30 includes a refractive index profile with a core 21 having a central core 22 having a core delta ($\Delta 1$) of less than 2.2%, a moat 24 surrounding the central core 22 having a moat delta ($\Delta 2$) less than −0.65%, and a ring 26 surrounding the moat having a positive ring delta ($\Delta 3$). The refractive index profile of the DC fiber 20 is selected to provide a total dispersion less than −96 and greater than −130 ps/nm/km at 1550 nm; a dispersion slope more negative than −0.35 and less negative than −0.85 ps/nm$^2$/km at 1550 nm; and a kappa, defined as the total dispersion at 1550 nm divided by the dispersion slope at 1550 nm, of greater than 163 and less than 219 nm.

Figure 2:
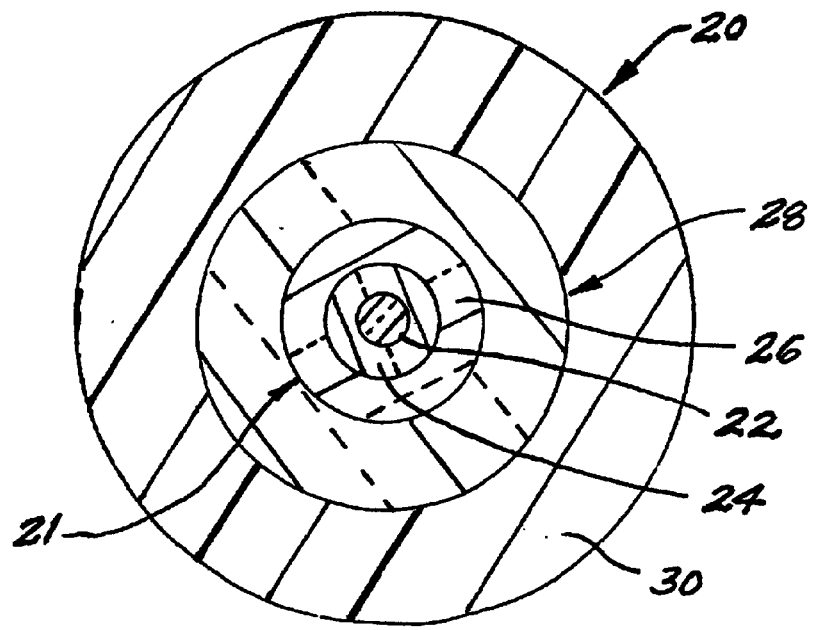
FIG. 2 is a cross-sectional end view of one embodiment of the present invention DC fiber.
Figure 3:
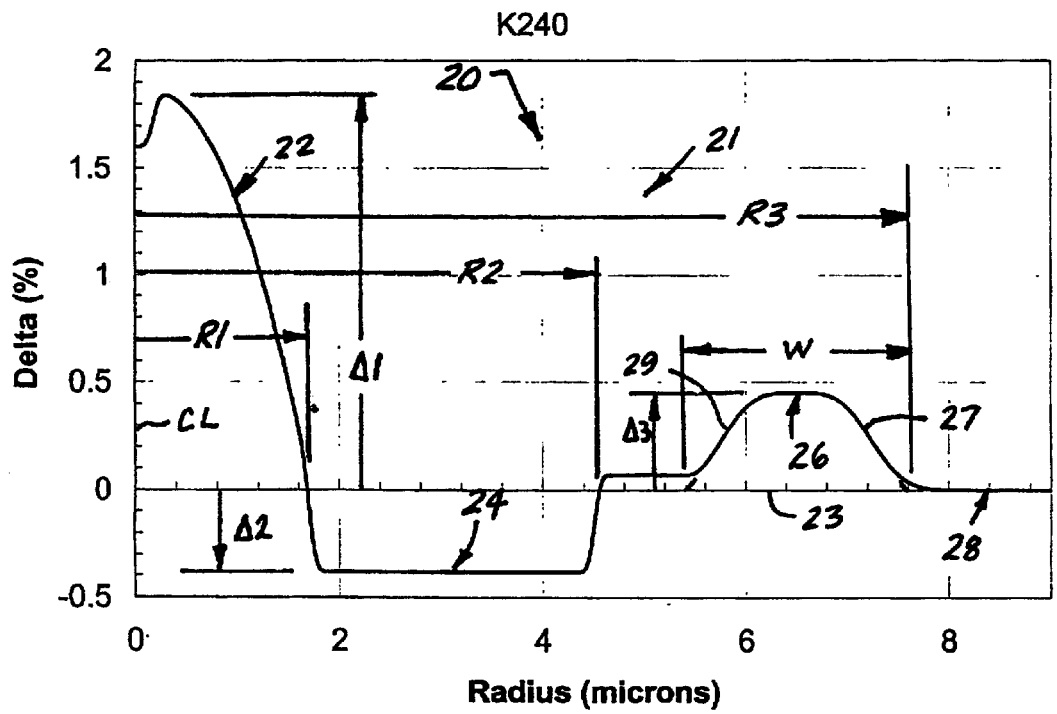
FIG. 3 is a graphic plot of a refractive index profile for one embodiment of DC fiber in accordance with the present invention.
Figure 4:
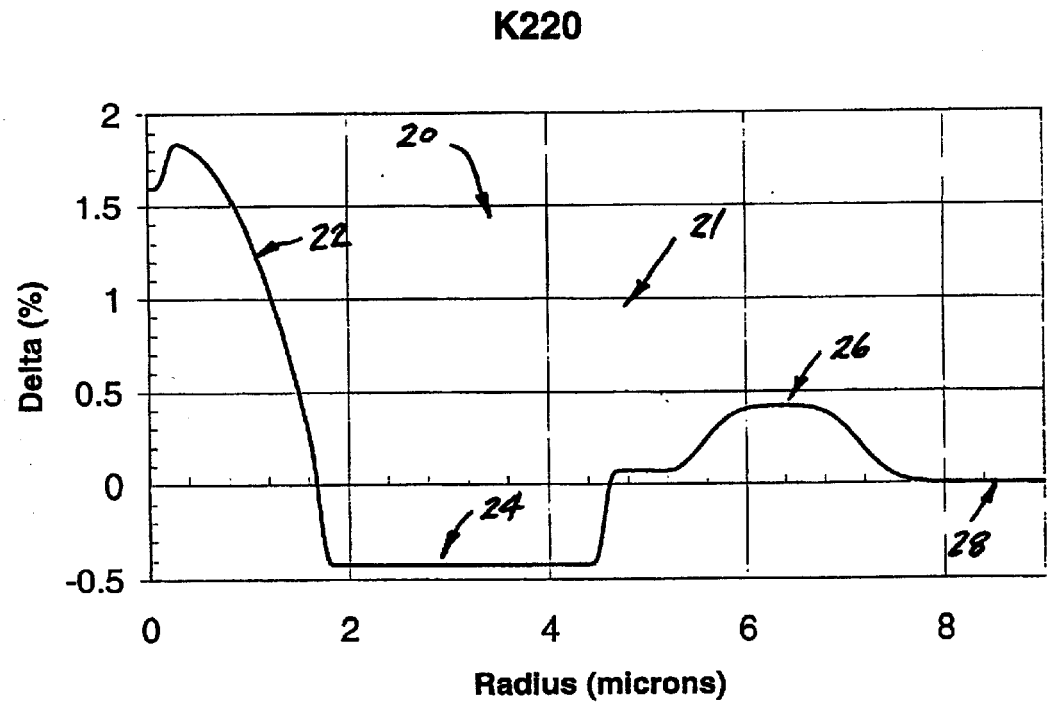
FIGS. 4–15 are graphic plots of refractive index profiles for other embodiments of DC fiber in accordance with the present invention.
Figure 5:
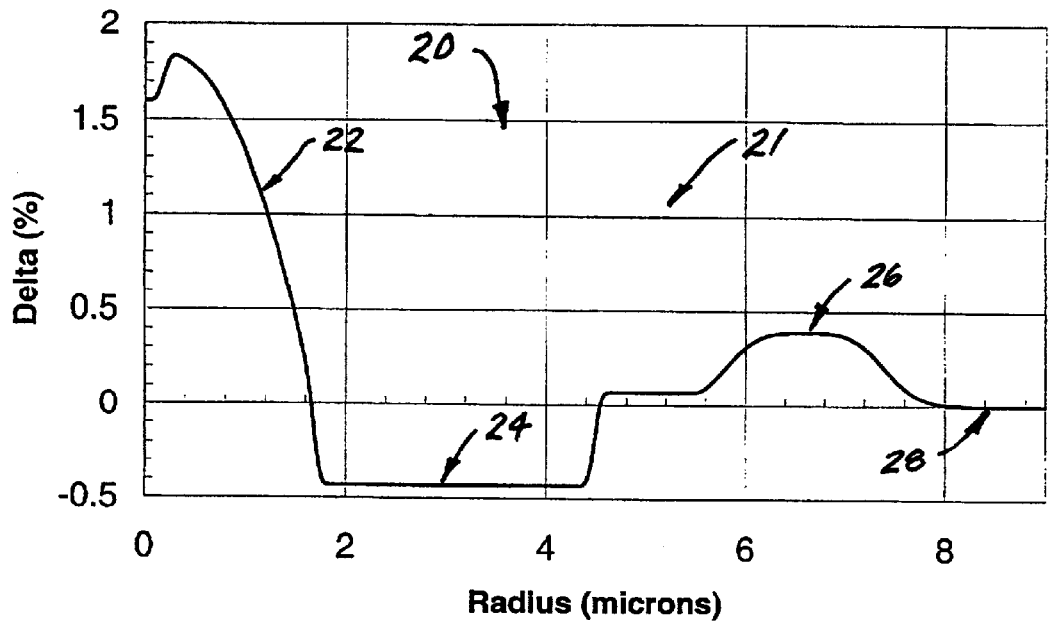
Figure 6:
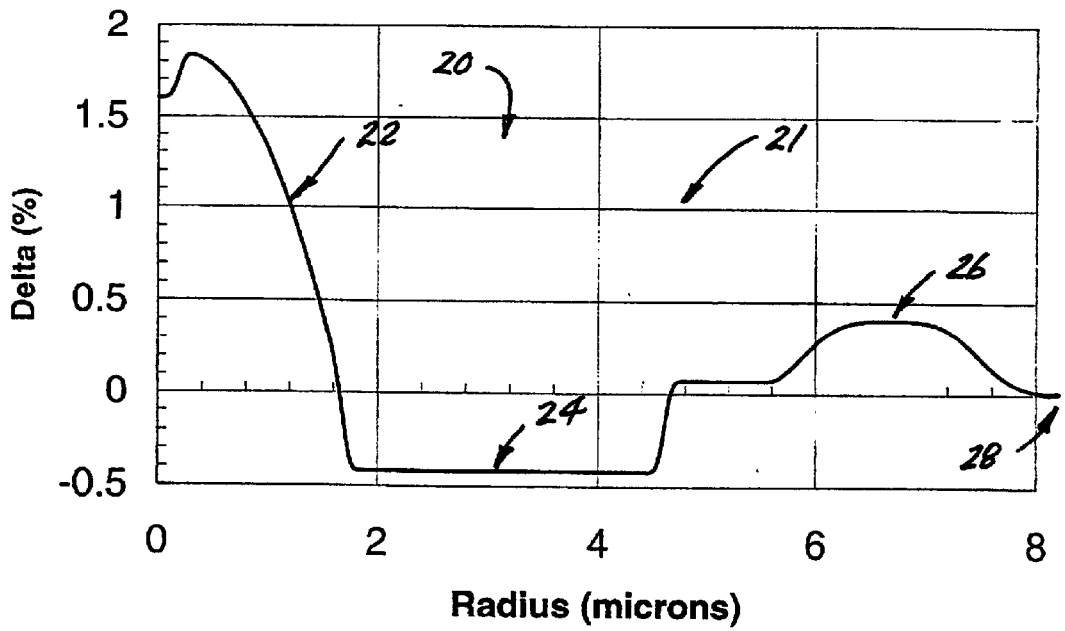
Figure 7:
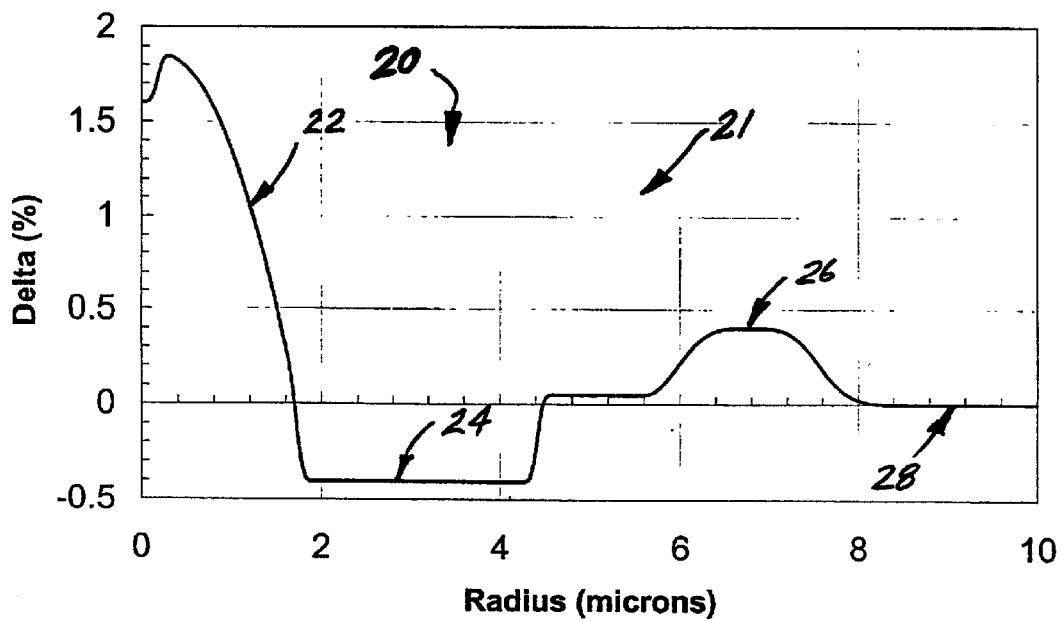
Figure 8:
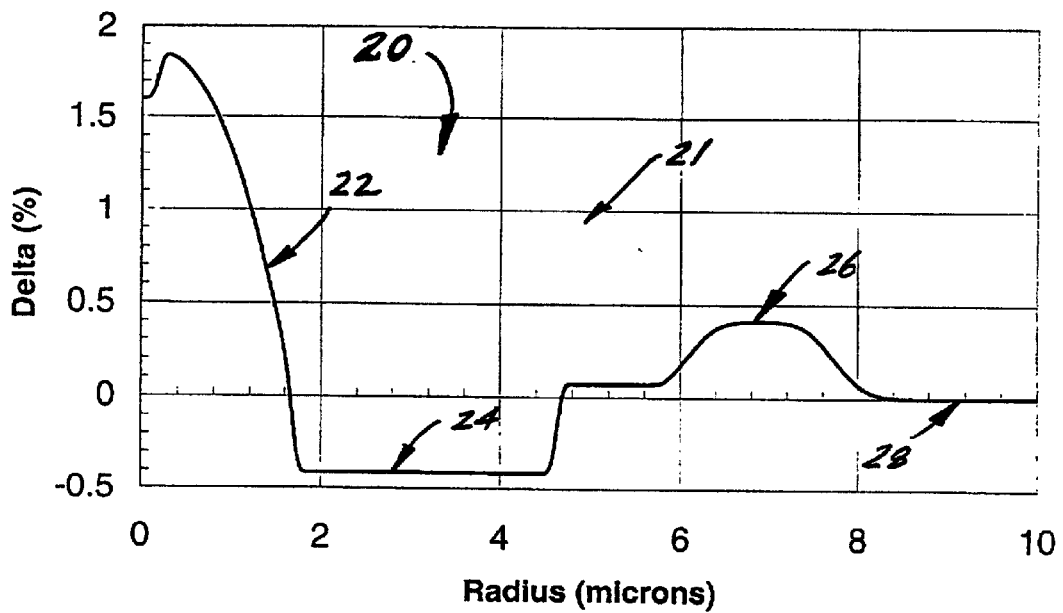
Figure 9:
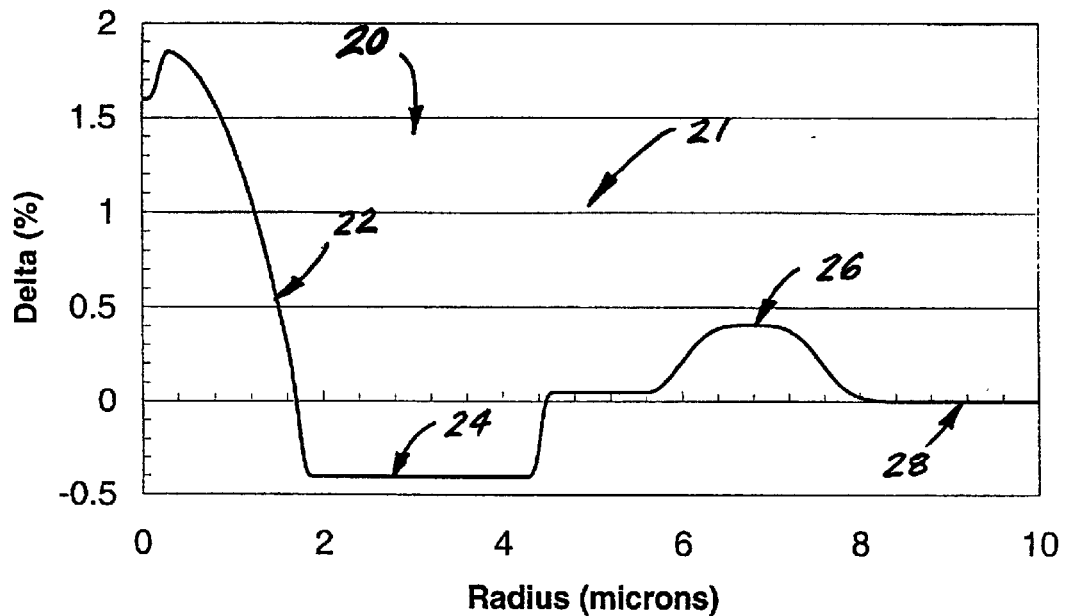
Figure 10:
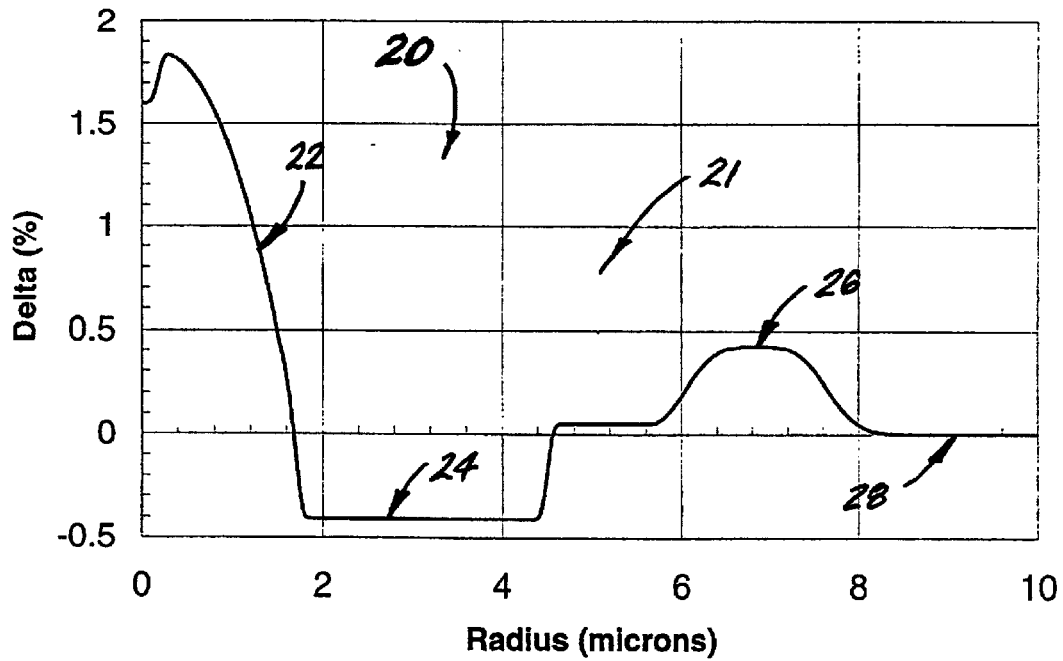
Figure 11:
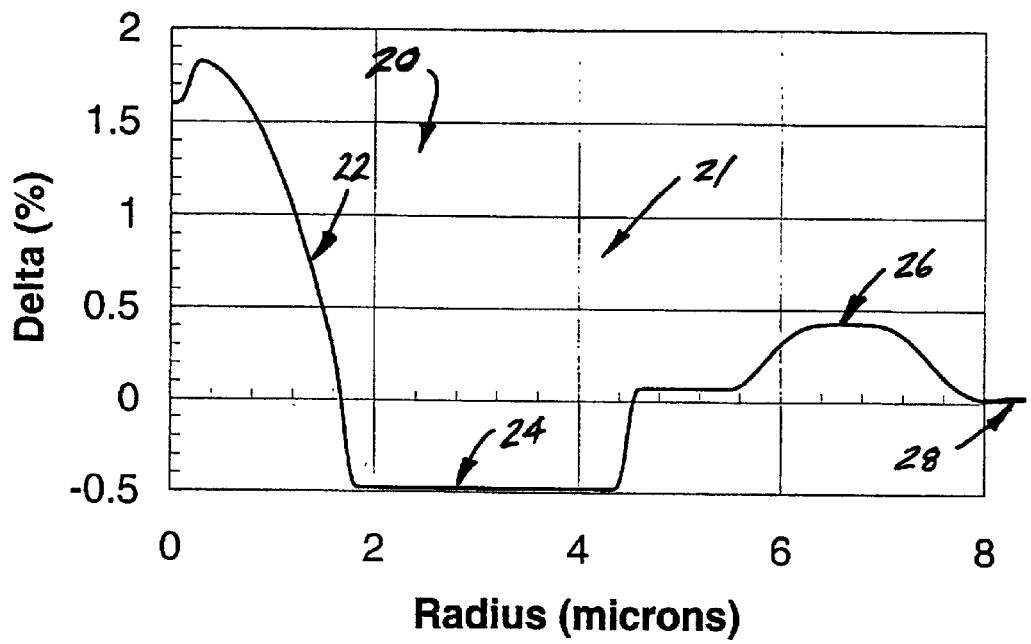
Figure 12:
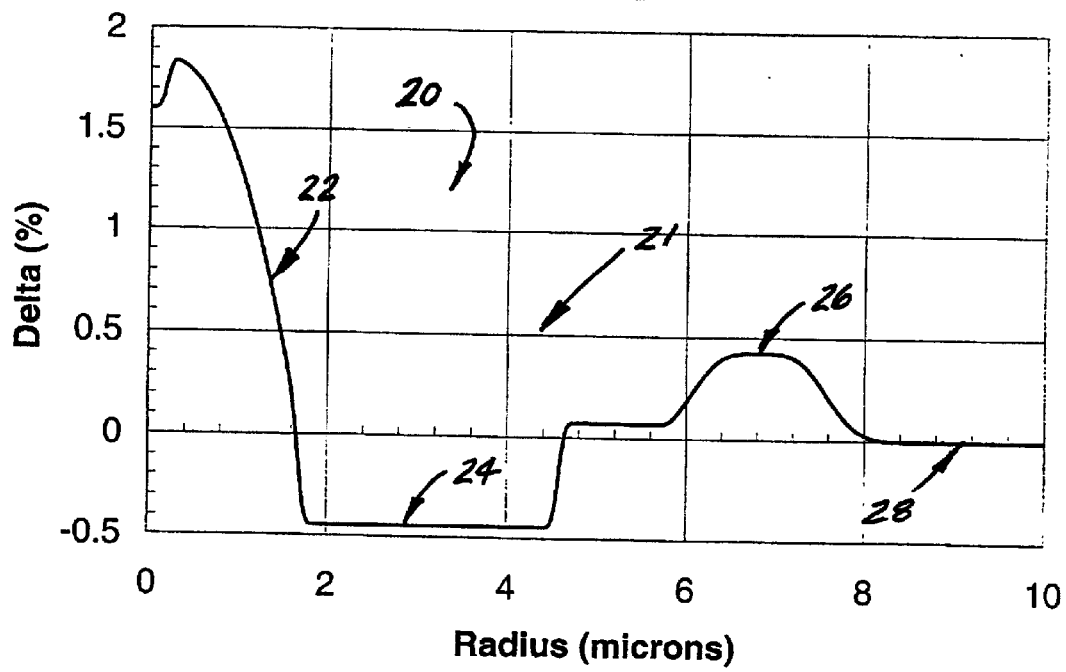
Figure 13:
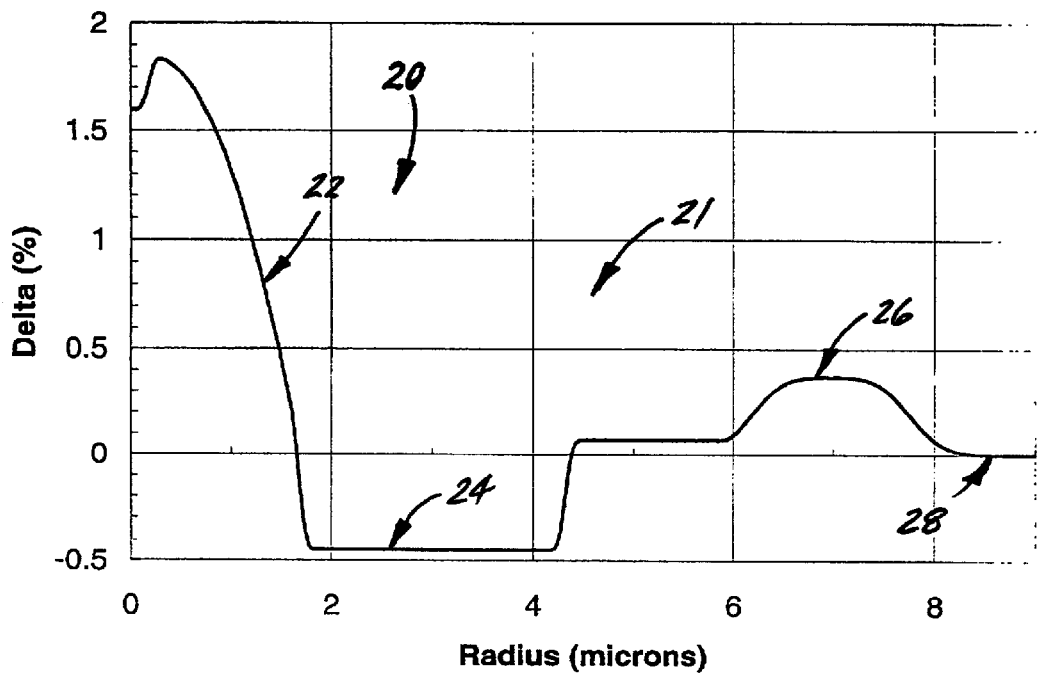
Figure 14:
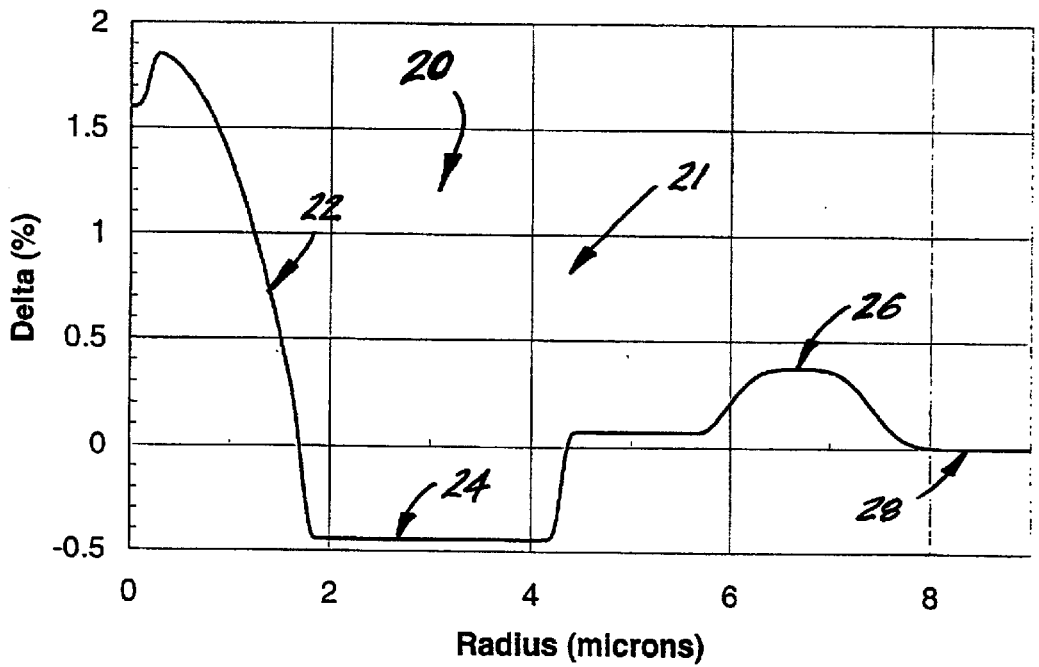
Figure 15:
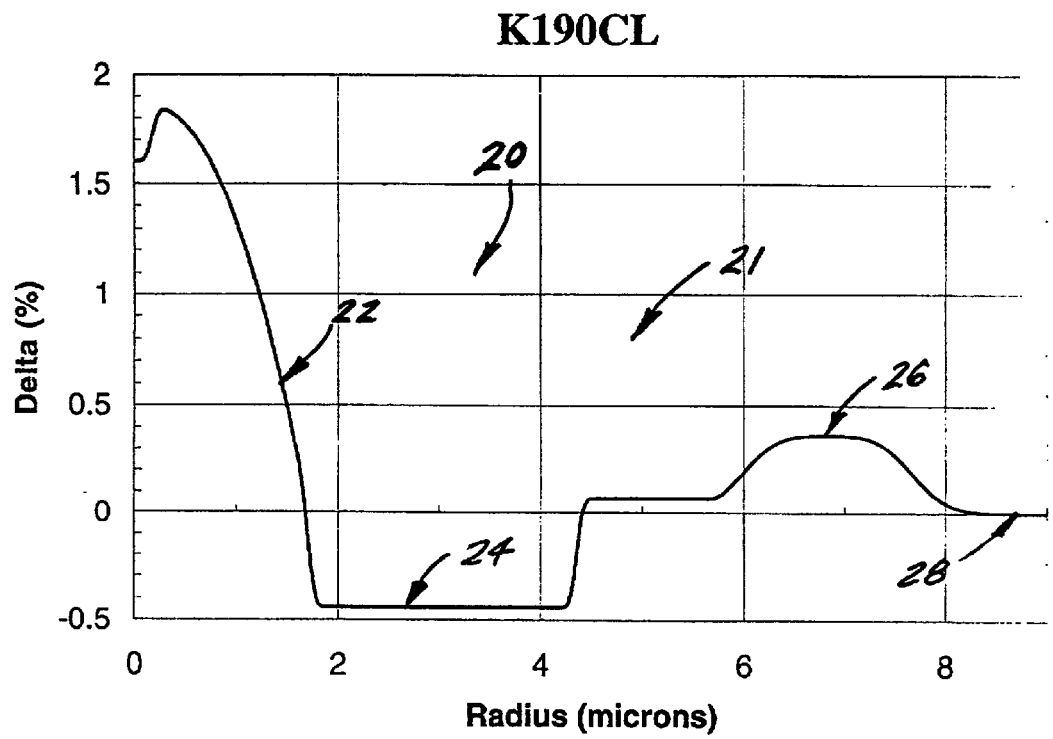
Figure 28:
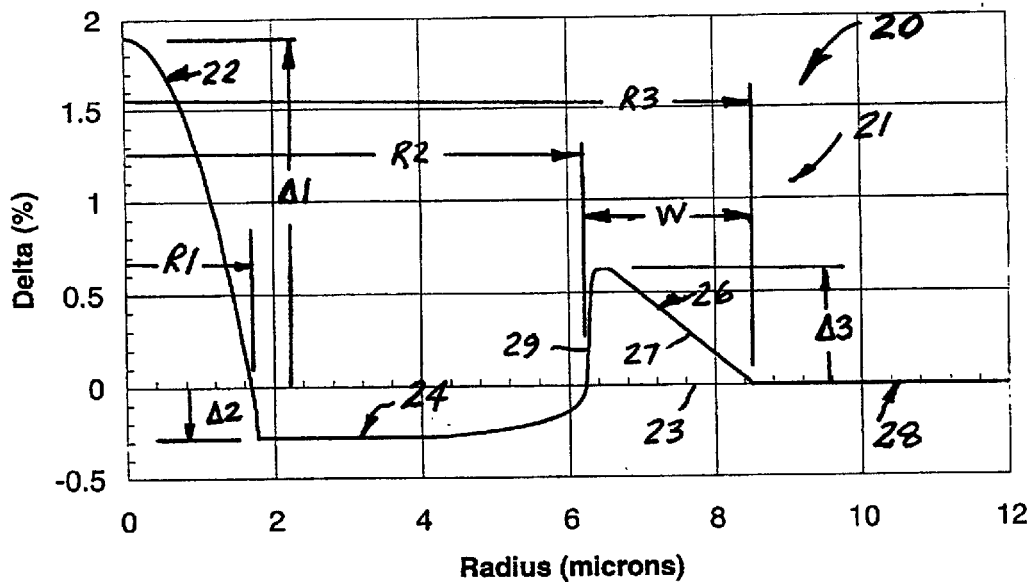
FIG. 28 is a graphic plot of a refractive index profile of another embodiment of DC fiber in accordance with the present invention.

In particular, all the DC fibers 20 in accordance with embodiments of the invention have a refractive index profile and structure including (as shown in FIGS. 2, 3 or 28) a core 21 having a central core 22 with a core delta ($\Delta 1$) measured to the highest point on the central core having a value greater than 1.5%, a depressed moat 24 surrounding the central core 22 having a moat delta (Δ2) with a delta value less negative than −0.65% (measured to the lowest point in the moat), and a ring 26 surrounding the moat 24 having a positive ring delta (Δ3) measured to the highest point on the ring. The core 22 preferably include an α-profile where α is between about 2 and 5. The DC fiber 20 preferably also includes a cladding 28 surrounding the core 21 which is preferably silica, but may include other suitable dopants as well. The cladding 28 of the DC fiber 20 is preferably surrounded by a conventional polymer coating 30 (see FIG. 2), such as a urethane acrylate coating. Preferably, the coating 30 exhibits a low-modulus primary coating, and a high-modulus outer secondary coating, as is known to those of skill in the art.

The DC fiber 20 in accordance with certain embodiments of the invention preferably has a core-moat ratio, defined as the radius (R1) to the outer edge of the central core 22 divided by a radius (R2) to the outer edge of the moat 24, of greater than 0.31 (see FIGS. 3–15). Other embodiments (see FIGS. 28–30) include core-moat ratios between 0.23 and 0.29. Further descriptions of the DC fibers follow herein below.

By way of further clarification, the transmission lines 18 (FIG. 1), 118 (FIG. 27), and 218 (FIG. 42) include a first section of positive dispersion, positive dispersion slope transmission fiber 19, such as the NZDSF described above, a DC fiber (e.g., 20) in accordance with the invention having a negative total dispersion and negative dispersion slope preferably more negative than −0.30 ps/nm$^2$/km. The transmission line 118 may also include a length of trim fiber 32 (see FIG. 27) that may have a positive slope and positive dispersion and with a lower slope but higher total dispersion than the transmission fiber 19 (e.g., NZDSF).

The transmission lines 18, 118, 218 described herein illustrate very low average residual dispersions across the C-, L-, C+L and S-bands. FIGS. 22–26 illustrate average residual dispersions of various transmission lines 18, 118 including various embodiments of the present invention DC fiber 20 and are described in detail herein below.

Advantageously, transmission lines 118 utilizing the DC fibers 20 in accordance with embodiments of the invention may have low average residual dispersion in the S-band from 1480 to 1525 nm. Typically, addition of trim fiber 32 (FIG. 27) to the line including the transmission fiber 19 and DC fiber 20 is desired to provide low +/− average residual dispersion values (see FIG. 26). In the example transmission line 118 shown in FIG. 27, optically serially coupling a section of trim fiber 32 to a segment of DC fiber 20 improves the residual dispersion of the transmission system 118 in the S-band. Preferably, the trim fiber 32 has a step-type refractive index profile with a delta of about 0.36% and a core radius of about 4.5 μm such as SMF-28™ fiber available from Corning Incorporated of Corning, N.Y. The trim fiber 32 preferably has a positive total dispersion of between about 14 and 20 ps/nm$^2$/km at 1550 nm, and a dispersion slope of between about 0.04 and 0.07 ps/nm$^2$/km at 1550 nm. The line typically includes amplifiers 42, 44, transmitters 40, and receivers 46.

From the description below it will be apparent that using the DC fibers 20 in accordance with embodiments of the invention in a transmission line 18, 188, 218 (such as in the form of a Dispersion Compensating Module) DCM, the average residual dispersion over the entire C-band, L band, C+L band combined, or S-band can be made to be very low.

Each of the transmission lines 18, 118, 218 may include conventional elements, such as a transceiver 40, optical pre-amplifier 42, optical power amplifier 44, and receiver 46 therein. Optionally, the transmission lines 18, 118, 218 may couple to one or more additional lengths of NZDSF or other transmission fiber instead of terminating at the receiver 46. Further additional components such as filters, couplers, and amplifiers may also be included in the transmission lines.

In accordance with the invention, and in more detail, a family of refractive index profiles of the dispersion compensation fiber 20 are described herein. FIG. 3 will be utilized to describe the refractive index structure of the first family of DC fibers 20. The refractive index profiles for the first family of Dispersion Compensation (DC) fibers 20 are provided in FIGS. 3–15. The DC fibers 20 each have a refractive index profile including a core 21 surrounded by a cladding 28 which extends to the outermost glass periphery of the fiber. The core 21 has a central core 22 having a core delta (Δ1) with a value greater than 1.5%, a moat 24 surrounding the central core 22 having a moat delta (Δ2) with a value less negative than −0.65%, and a ring 26 surrounding the moat 24 having a positive ring delta (Δ3).

Figure 16:
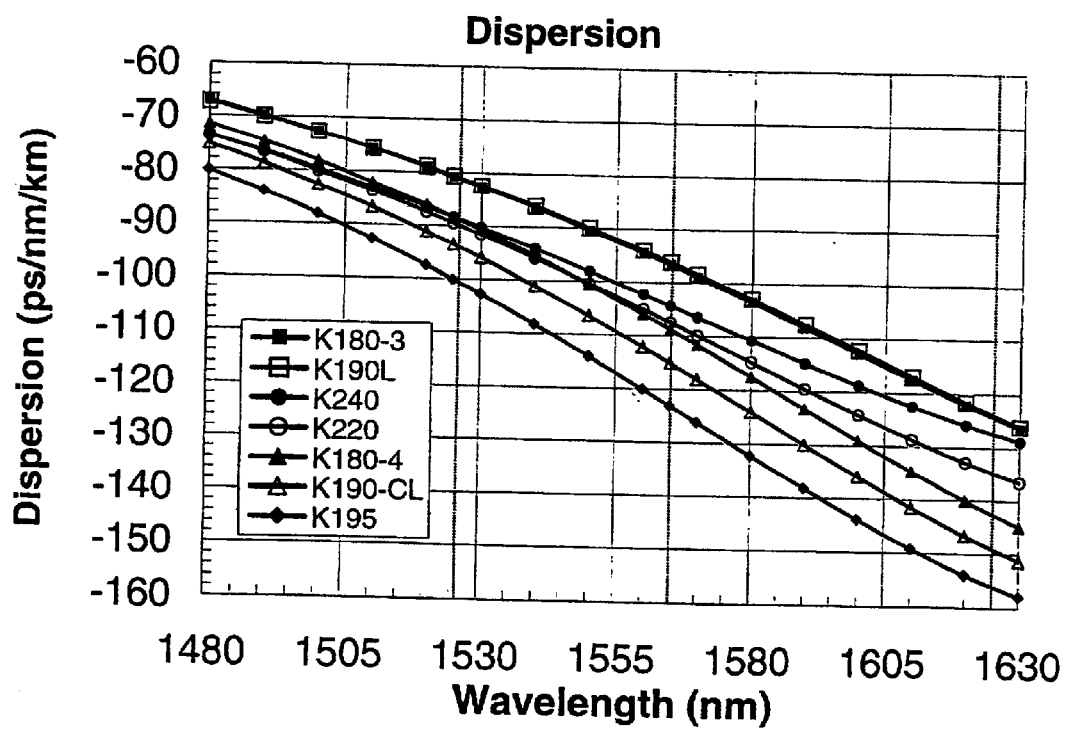
FIGS. 16 and 17 are graphic plots of total dispersion as a function of wavelength for the first group of DC fibers of FIGS. 3–15 in accordance with the present invention.
Figure 17:
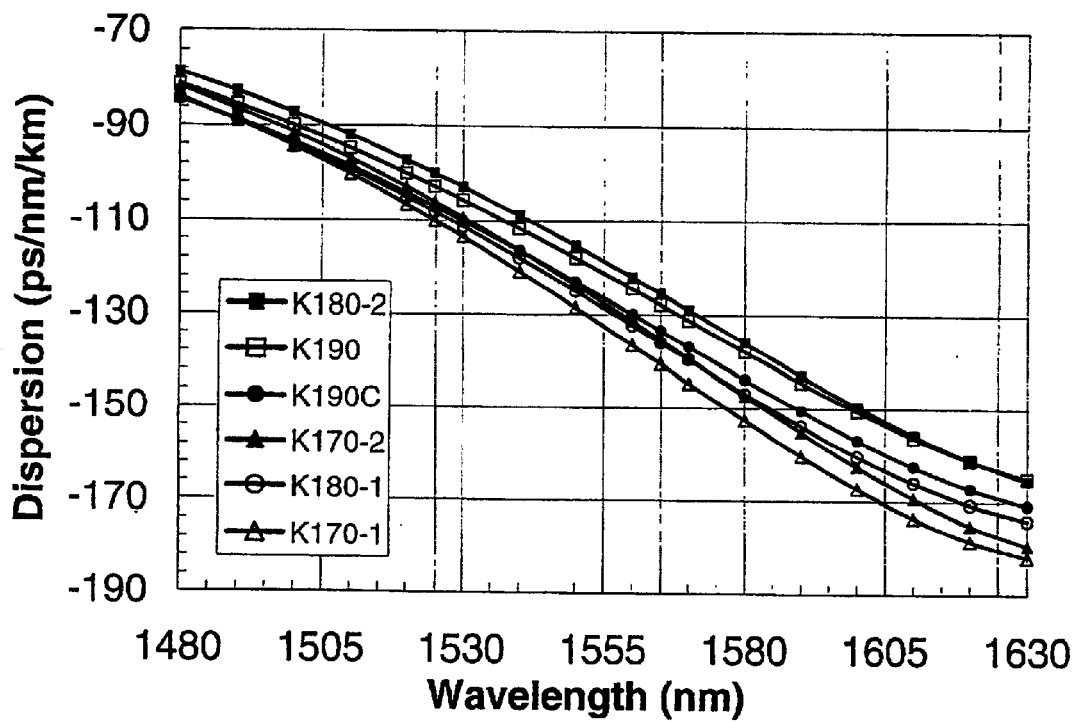

The refractive index profiles of the DC fibers 20 are selected to provide a total dispersion (defined as the measured dispersion including both the material dispersion and waveguide dispersion) less than −87 and greater than −167 ps/nm/km at 1550 nm; a dispersion slope more negative than −0.30 ps/nm$^2$/km at 1550 nm; and a kappa value defined as the total dispersion at 1550 nm divided by the dispersion slope at 1550 nm of greater than 151 and less than 244. The core-moat ratio of the DC fibers 20, defined as a radius (R1) to the outer edge of the central core 22 divided by a radius (R2) to the outer edge of the moat 24, is greater than 0.31. One particular advantage of the present invention DC fiber 20 is that the total dispersion is very linear as a function of wavelength as is shown in FIGS. 16 and 17. In particular, the total dispersion varies by less than 75 ps/nm/km over the C- and L-band range from 1525 to 1625 nm; and more preferably less than 50 ps/nm/km over the range from 1525 to 1625 nm.

Figure 18:
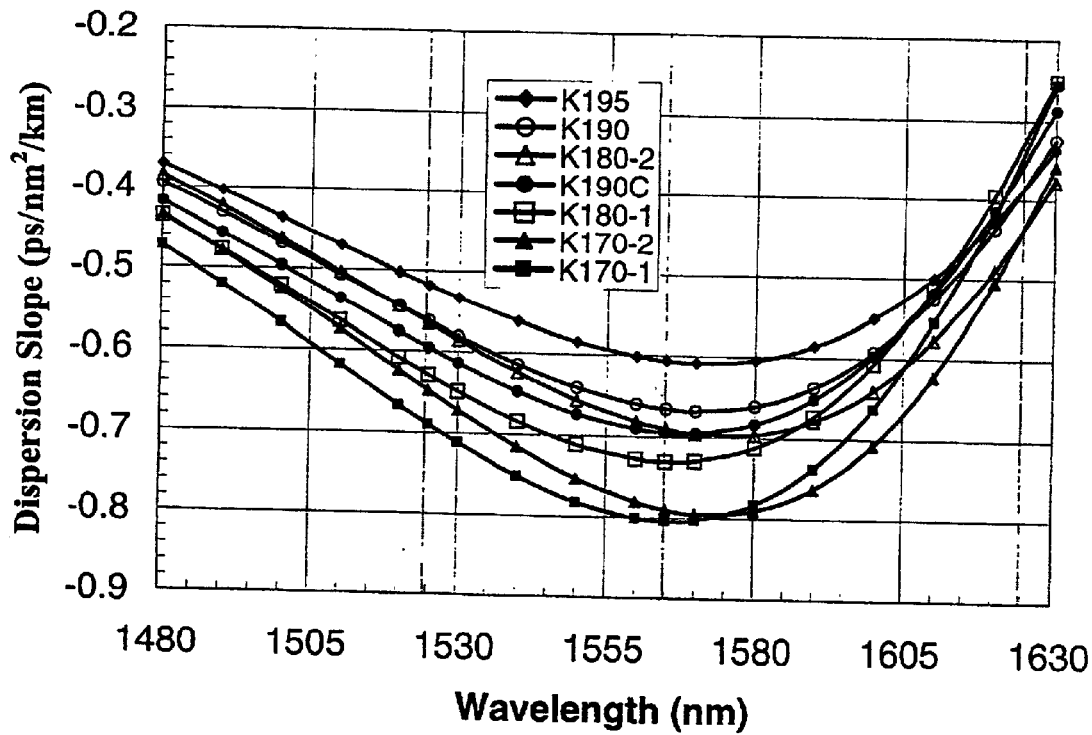
FIGS. 18 and 19 are graphic plots of dispersion slope as a function of wavelength for the first group of DC fibers in accordance with the present invention.
Figure 19:
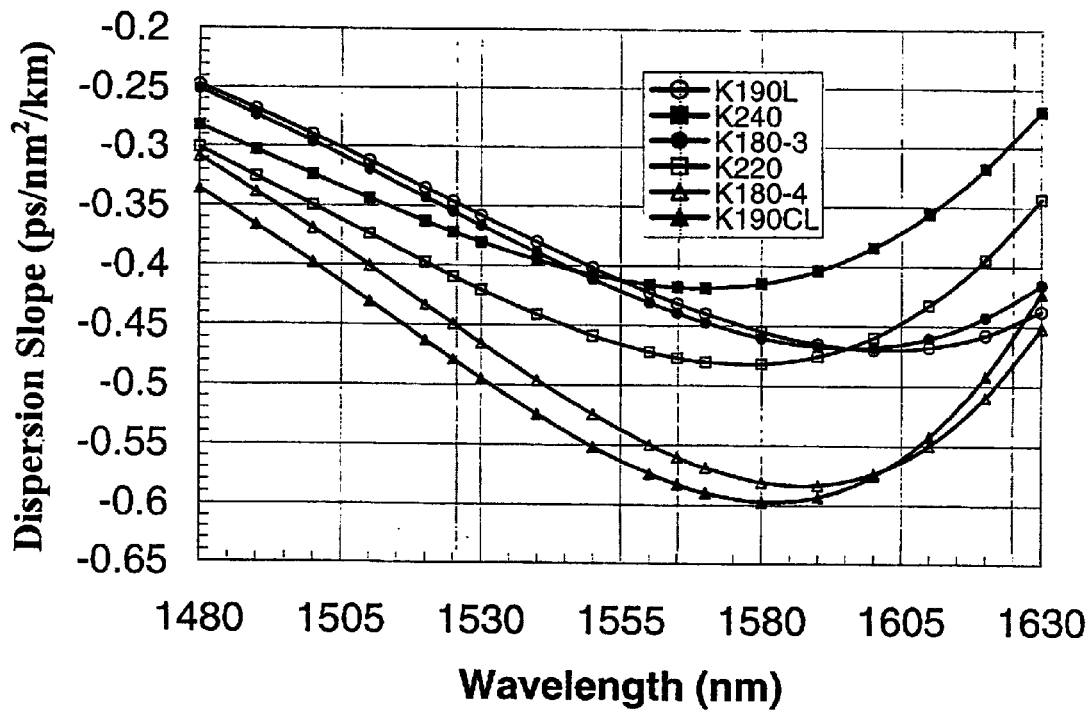

Within the family of DC fibers 20 in accordance with the invention as shown in FIGS. 16 and 17, a more preferred total dispersion range at a wavelength of 1550 nm is less than −96 and greater than −150 ps/nm/km; more preferably less than −96 and greater than −125 ps/nm/km, and most preferably less than −100 and greater than −120 ps/nm/km. The dispersion slope within the family of DC fibers 20, as shown in FIGS. 18 and 19 ranges between less than −0.30 and greater than −1.3 ps/nm$^2$/km at 1550 nm; and more preferably more negative than −0.35 and less negative than −0.85 ps/nm$^2$/km at 1550 nm. Kappa for the family of DC fibers 20 at 1550 nm is more preferably greater than 156 and less than 244 nm; more preferably greater than 163 and less than 219 nm; and most preferably greater than 175 and less than 214 nm.

Figure 20:
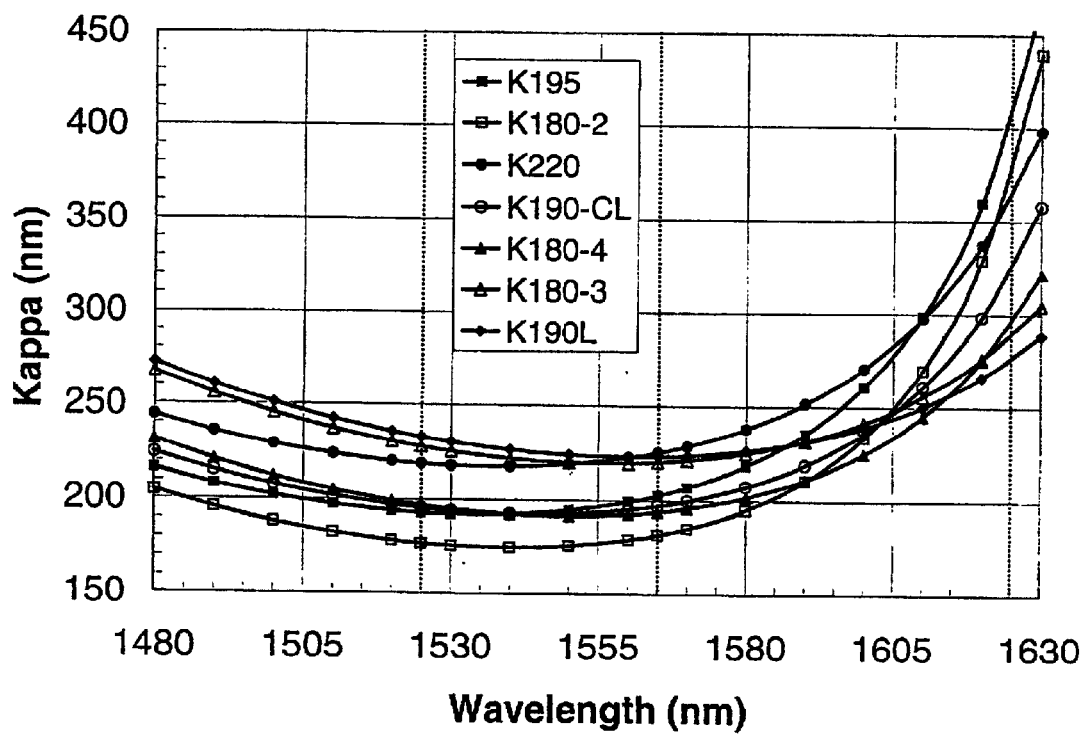
FIGS. 20 and 21 are graphic plots of kappa as a function of wavelength for the first group of DC fibers in accordance with the present invention.
Figure 21:
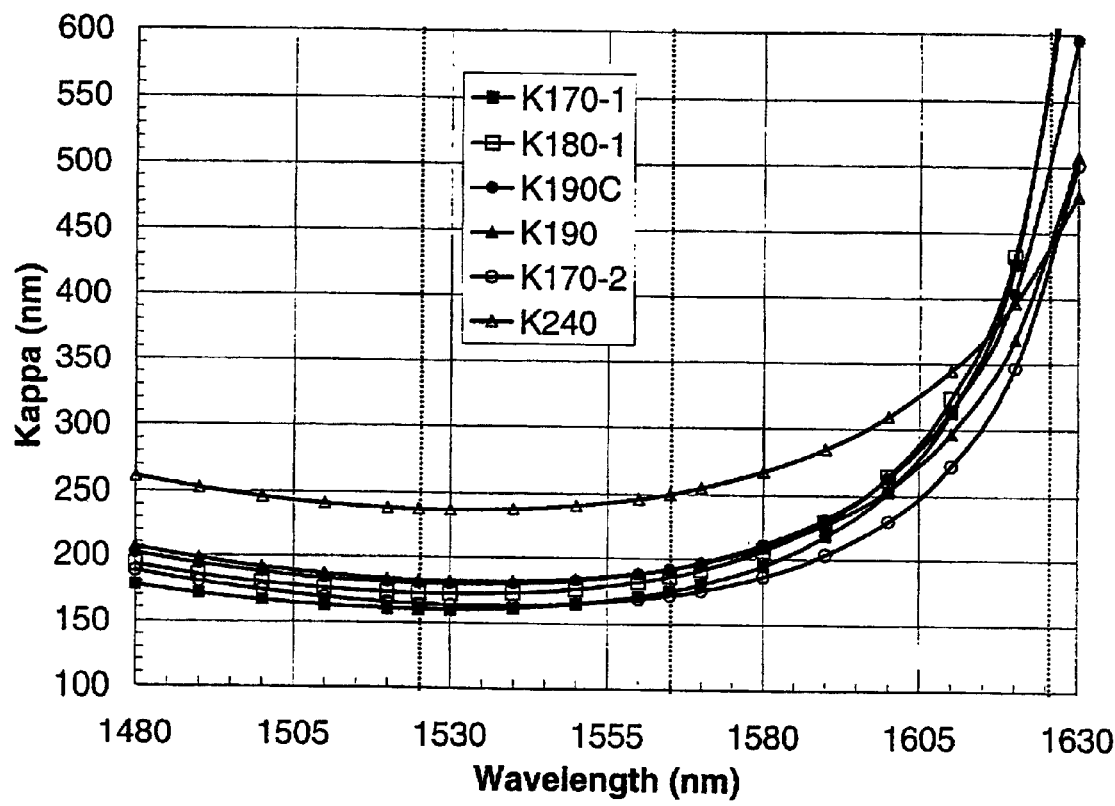

As is illustrated in FIGS. 20 and 21, the family of DC fibers 20 have kappas that are quite linear over the desired transmission bands, e.g., nearly flat over the C-band, and gradually ramping up in the L-band, thereby making them excellent candidates for providing low residual dispersion in transmission lines 18, 118, 218. In particular, as is illustrated in FIGS. 20 and 21, the DC fibers 20 have kappas that range between 150 and 450 nm over a wavelength range from 1525 to 1625 nm with some ranging between 150 and 350 nm over the C-and L-bands from 1525 to 1625 nm. Individual ones of the DC fibers 20 within the family exhibit kappas that are also very linear as a function of wavelength with kappa varying less than 100 nm over a C+L band wavelength range from 1525 to 1625 nm; and more preferably less than 75 nm over the C+L band wavelength range from 1525 to 1625 nm (see for example, FIG. 20).

The family of DC fibers 20 in accordance with the invention have effective areas at 1550 nm of greater than 15 square microns; and preferably ranging from 17 to 20 square microns. Additionally, the family of DC fibers 20 exhibits excellent macro-bending properties with pin array bend losses of less than 5.5 dB at 1550 nm; and more preferably less than 4.0 dB at 1550 nm. The calculated pin array for the first family of DC fibers 20 in accordance with the invention ranges from 5.12 to 0.77 dB. The micro-bending properties of the first family of DC fibers 20 is very good with lateral load micro-bend measurements of less than 1 dB/m; and more preferably less than 0.5 dB/m. Further, the first family of DC fibers 20 preferably has an attenuation of less than 0.5 dB/km at 1550 nm and a measured fiber cutoff wavelength of less than 1500 nm. The cabled cutoff of the family of DC fibers 20 is also less than 1500 nm.

The structure of the family of DC fibers 20 in accordance with the invention are shown in FIGS. 3–15 and are listed in Table 1 below as examples 1–13. FIG. 3 illustrates the radii dimensions R1, R2, R3, the ring width W, and the delta parameters $\Delta 1$, $\Delta 2$, and $\Delta 3$. In particular, the conventions utilized to measure these parameters for FIG. 3 are shown only with reference to FIG. 3, but apply to the refractive index profiles of FIGS. 4–15 also.

For the first family of DC fibers 20 of FIGS. 3–15 according to the invention, the core delta ($\Delta 1$) of the central core 22 is more preferably greater than 1.5% and less than 2.0%. The core radius (R1) of the central core 22 is between about 1.52 and 1.93 microns; and more preferably between about 1.65 and 1.75 microns. Each of the DC fibers 20 includes a moat 24 having a negative moat delta ($\Delta 2$). The deepest moat delta ($\Delta 2$) for each of the members of the family of DC fibers 20 is preferably between −0.35% and −0.65%; and more preferably between −0.35% and −0.55%. In accordance with these embodiments of the invention, the outer moat radius (R2) of the moat 24 is less than 5.0 microns from the DC fiber's centerline (CL). More preferably, the moat radius (R2) is between about 4.0 and 5.0 microns from the centerline; and more preferably between about 4.25 and 4.75 microns from the centerline.

In the first family of DC fibers 20, the core-moat ratio, defined as the core radii (R1) divided by the moat radii (R2) is greater than 0.31; more preferably greater than 0.35 and less than 0.40; and most preferably greater than 0.37 and less than 0.39. Having the core-moat ratio within this range provides that the dispersion of the transmission fiber in a transmission line is properly compensated for, i.e., not under or over compensated. In particular, having the desired core-moat ratio helps provides a kappa curve as a function of wavelength which is fairly linear (only increases slowly with wavelength) as described above.

In accordance with further features of the invention, the refractive index profile includes a ring 26 having a positive ring delta ($\Delta 3$). The ring delta ($\Delta 3$) is preferably between about 0.35 and 0.52% and the ring radius (R3), measured to the outer edge of the ring 26, is between about 6.4 and 8.3 microns. The ring 26 has a ring width (W) which is preferably between about 1.1 to 1.5 microns. For this family of DC fibers 20, the inner edge of the ring 26 in these embodiments is offset from the outer edge of the moat by 0.5 microns or more.

EXAMPLES

The present invention will be further clarified by the following examples that are summarized in Tables 1 and 2 below. Table 1 includes attributes and refractive index parameters for the first group of DC fibers 20 in accordance with the invention that correspond to FIGS. 3–21 herein. Likewise, Table 2 includes attributes and refractive index parameters for a second group of DC fibers in accordance with the invention that correspond to FIGS. 28–33.

TABLE 1

Dispersion Compensation Fiber Examples

| Ex. | Legend | Dispersion ps/nm/km | Slope ps/nm²/km | Kappa nm | $\Delta 1$ % | $\Delta 2$ % | $\Delta 3$ % | R1 µm | R2 µm | R3 µm | Ring Width µm | C/M Ratio | Pin Array dB | Lateral Load dB/m | Aeff µm² | λc nm |
|---|---|---|---|---|---|---|---|---|---|---|---|---|---|---|---|---|
| 1 | K240 | −98 | −0.41 | 241 | 1.85 | −0.39 | 0.45 | 1.72 | 4.52 | 7.58 | 2.08 | 0.38 | 0.77 | 0.10 | 16.9 | 1696 |
| 2 | K220 | −101 | −0.46 | 219 | 1.85 | −0.42 | 0.42 | 1.72 | 4.57 | 7.55 | 2.27 | 0.38 | 1.30 | 0.14 | 16.6 | 1678 |
| 3 | K195 | −114 | −0.44 | 195 | 1.85 | −0.43 | 0.39 | 1.70 | 4.50 | 7.80 | 2.30 | 0.38 | 3.55 | 0.38 | 17.0 | 1667 |
| 4 | K190/200 | −118 | −0.64 | 184 | 1.85 | −0.42 | 0.40 | 1.68 | 4.62 | 8.85 | 2.22 | 0.36 | 4.61 | 0.53 | 17.3 | 1670 |
| 5 | K180-1 | −125 | −0.71 | 176 | 1.85 | −0.43 | 0.41 | 1.69 | 4.49 | 8.90 | 2.12 | 0.38 | 4.76 | 0.66 | 17.5 | 1731 |
| 6 | K180-2 | −115 | −0.66 | 176 | 1.85 | −0.41 | 0.41 | 1.70 | 4.64 | 8.15 | 2.35 | 0.37 | 3.20 | 0.47 | 17.1 | 1753 |
| 7 | K180-3 | −113 | −0.47 | 242 | 1.86 | −0.41 | 0.41 | 1.73 | 4.43 | 8.08 | 2.28 | 0.39 | 4.56 | 0.60 | 19.4 | 1713 |
| 8 | K180-4 | −100 | −0.52 | 193 | 1.85 | −0.41 | 0.42 | 1.72 | 4.53 | 7.95 | 2.20 | 0.38 | 1.15 | 0.18 | 16.4 | 1758 |
| 9 | K170-1 | −129 | −0.78 | 165 | 1.84 | −0.48 | 0.43 | 1.72 | 4.49 | 7.98 | 2.23 | 0.38 | 4.61 | 0.63 | 17.2 | 1724 |
| 10 | K170-2 | −124 | −0.75 | 165 | 1.85 | −0.45 | 0.42 | 1.69 | 4.58 | 7.85 | 2.27 | 0.37 | 5.12 | 0.65 | 17.1 | 1709 |
| 11 | K190C | −123 | −0.67 | 183 | 1.85 | −0.44 | 0.37 | 1.69 | 4.33 | 8.15 | 2.25 | 0.38 | 5.02 | 0.60 | 17.4 | 1687 |
| 12 | K190L | −90 | −0.40 | 224 | 1.86 | −0.44 | 0.37 | 1.73 | 4.31 | 7.78 | 2.08 | 0.39 | 0.82 | 0.08 | 15.8 | 1680 |
| 13 | K190CL | −107 | −0.55 | 193 | 1.85 | −0.44 | 0.37 | 1.72 | 4.37 | 8.05 | 2.37 | 0.38 | 1.97 | 0.25 | 16.6 | 1689 |

TABLE 2

Dispersion Compensation Fiber Examples

| Ex. | Legend | Dispersion ps/nm/km | Slope ps/nm²/km | Kappa nm | $\Delta 1$ % | $\Delta 2$ % | $\Delta 3$ % | R1 µm | R2 µm | R3 µm | Ring Width µm | C/M Ratio | Pin Array dB | Lateral Load dB/m | Aeff µm² | λc nm |
|---|---|---|---|---|---|---|---|---|---|---|---|---|---|---|---|---|
| 14 | K210-3 | −98 | −0.47 | 210 | 1.9 | −0.28 | 0.63 | 1.70 | 6.25 | 8.58 | 2.25 | 0.27 | 4.71 | 0.057 | 18.6 | 1767 |
| 15 | K177-5 | −102 | −0.57 | 177 | 1.9 | −0.28 | 0.83 | 1.66 | 6.80 | 8.00 | 1.20 | 0.24 | 12.00 | 0.060 | 18.7 | 1727 |
| 16 | K184-6 | −103 | −0.56 | 184 | 1.9 | −0.28 | 0.76 | 1.65 | 6.50 | 8.15 | 1.65 | 0.25 | 15.43 | 0.064 | 19.0 | 1676 |

EXPERIMENTAL RESULTS

A DC fiber 20 in accordance with the present invention was experimentally manufactured and exhibited the measured attribute values outlined in Table 3 below.

TABLE 3

Experimental Results

| Attribute | Measured Value |
|---|---|
| Dispersion (ps/nm-km) @ 1550 nm | −114.1 |
| Slope (ps/nm²/km) @ 1550 nm | −0.578 |
| Kappa (nm) @ 1550 nm | 197.4 |
| MFD (microns) @ 1550 nm | 4.91 |
| Aeff (sq. microns) @ 1550 nm | 19.8 |
| Pin Array (dB) | 3.9 |
| Attenuation (dB/km) @ 1550 nm | 0.5 |
| Cabled Cutoff (nm) | 1467 |

Figure 35:
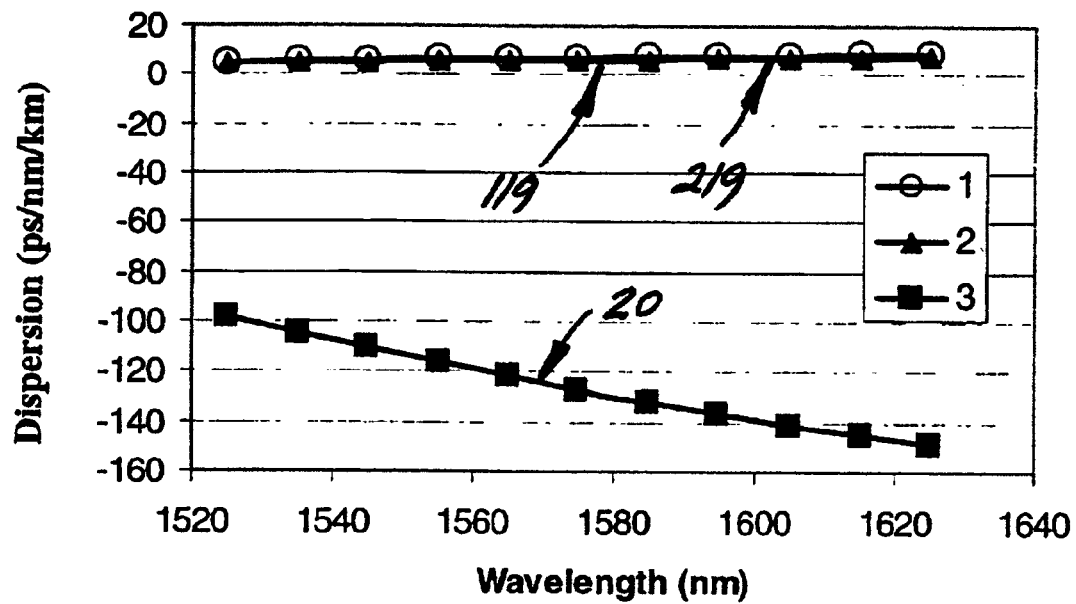
FIG. 35 is a graphic plot of total dispersion as a function of wavelength for a DC fibers of FIGS. 28–30 in accordance with the present invention.
Figure 36:
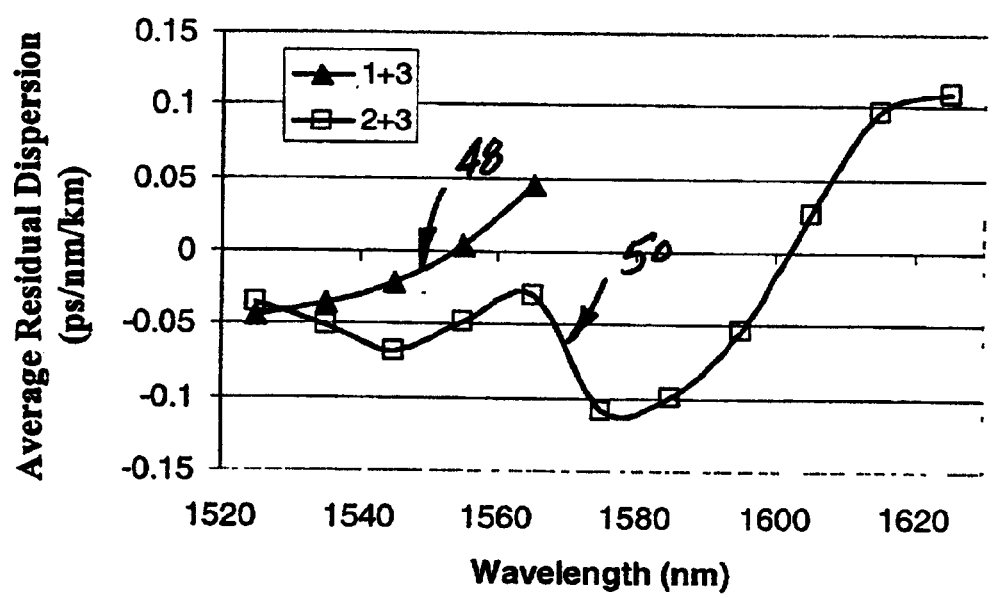
FIG. 36 is a graphic plot of residual dispersion as a function of wavelength for a transmission line including a DC fiber in the C and L bands in accordance with the present invention.

This experimental DC fiber has the measured dispersion plot labeled 20 in FIG. 35. Also shown on the plot of FIG. 35 are several actual low-slope NZDSFs 119, 219 having the attributes shown in Table 4 below. Fiber 1 corresponds to 119, whereas fiber 2 corresponds to fiber 219. The results of the DC fiber 20 and the transmission fibers 119, 219 were then modeled by inputting to the model the actual values for the fibers and plots of average residual dispersion in ps/nm/km were generated, as shown in FIG. 36. Modeled average residual dispersion results for a transmission line 18 (over the C-band) including the combination of 100 km of transmission fiber 1 (119) and 4.88 km of the DC fiber 3 (20) as described in Table 3 and are labeled as 48 therein. This plot illustrates a modeled High-to-Low average residual dispersion over the C-band (1525 to 1565 nm) of less than 0.12 ps/nm/km; and more preferably less than 0.1 ps/nm/km. The High-to Low Average residual dispersion is the difference between the highest and lowest average residual dispersion values in the respective band of interest. Likewise, plot 50 illustrates modeled average residual dispersion for a transmission line 18 including 100 km of the transmission fiber 2 (219) of Table 4 and 5.64 km of the DC fiber 3 (20) of Table 3 serially optically coupled in accordance with the invention. This transmission line 18 illustrates modeled High-to-Low average residual dispersion (see plot 50) of less than 0.30 ps/nm/km over the entire combined C+L bands from 1525 to 1625 nm; and more preferably less than 0.25 ps/nm/km.

TABLE 4

Low slope NZDSF transmission fiber data

| Attribute | 1 (119) | 2 (219) |
|---|---|---|
| Dispersion (ps/nm/km) @ 1550 nm | 6.3 | 5.4 |
| Slope (ps/nm²/km) @ 1550 nm | 0.034 | 0.030 |
| Lambda Zero (nm) | 1402 | 1408 |
| Kappa (nm) @ 1550 nm | 185.3 | 180 |

Figure 37:
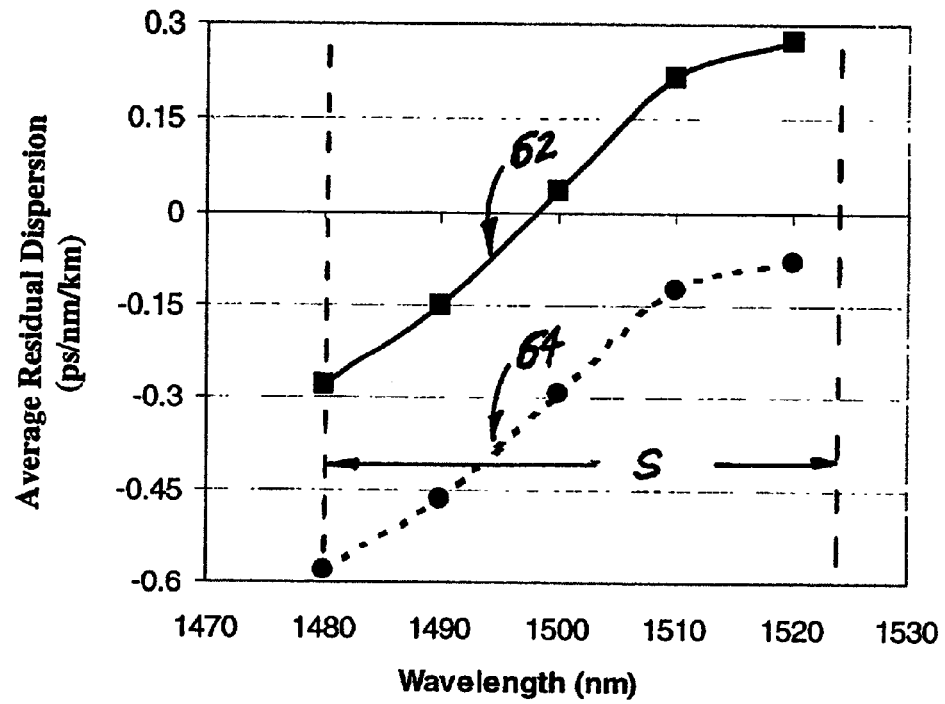
FIG. 37 is a graphic plot of residual dispersion as a function of wavelength for the transmission line including a DC fiber in the S-band in accordance with the present invention.

FIG. 37 illustrates a plot 64 (shown dotted) of modeled average residual dispersion over the S-band (1480 to 1525 nm) for a transmission line 18 including 5.64 km of the DCF 3 (20) of Table 3 and 100 km of the NZDSF 1 (119) of Table 4. The modeled High-to-Low average residual dispersion for the transmission line 18 in the S-band is less than 0.8 ps/nm/km; more preferably less than 0.6 ps/nm/km. By adding 2.3 km of trim fiber 32 (see FIG. 27), such as SMF-28™ described above, the modeled average residual dispersion in the S-band may be made to be less than +/−0.5 ps/nm/km; and more preferably less than +/−0.3 ps/nm/km as shown in curve labeled 62 in FIG. 37.

Modeled average residual dispersion is plotted as a function of wavelength in FIGS. 22–26. These plots are based upon transmission lines 18 including serially coupled lengths of transmission fiber 19 and DC fiber 20 in accordance with embodiments of the invention. For each of the plots, the transmission fiber 19 used in the model had a dispersion ranging from 6.3 to 7.8 ps/nm/km at 1550 nm and a dispersion slope of between 0.03 and 0.04 ps/nm²/km at 1550 nm.

Figure 22:
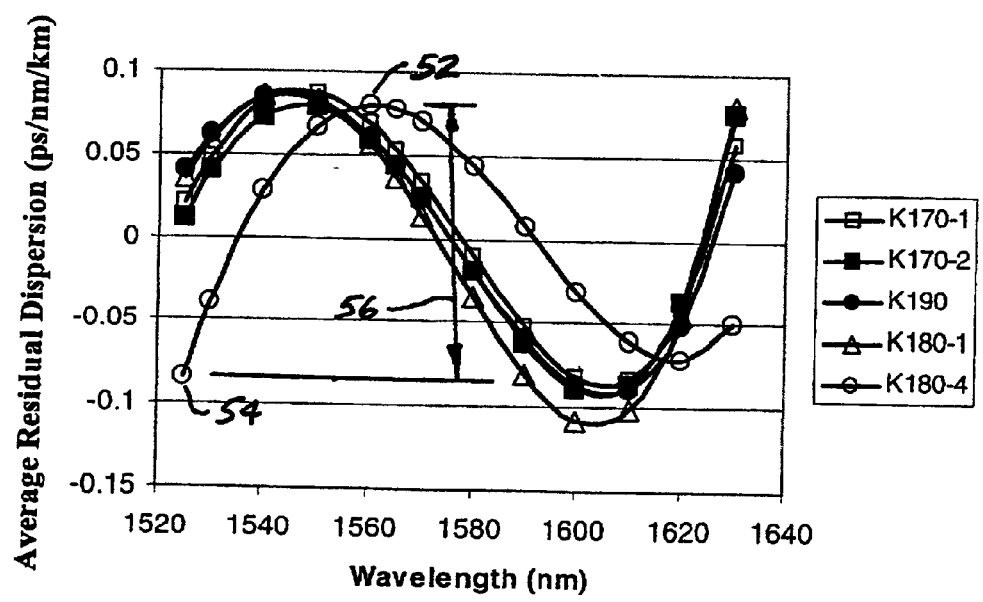
FIGS. 22–26 are graphic plots of residual dispersion as a function of wavelength for a transmission line including the first group of DC fibers in accordance with the present invention.
Figure 23:
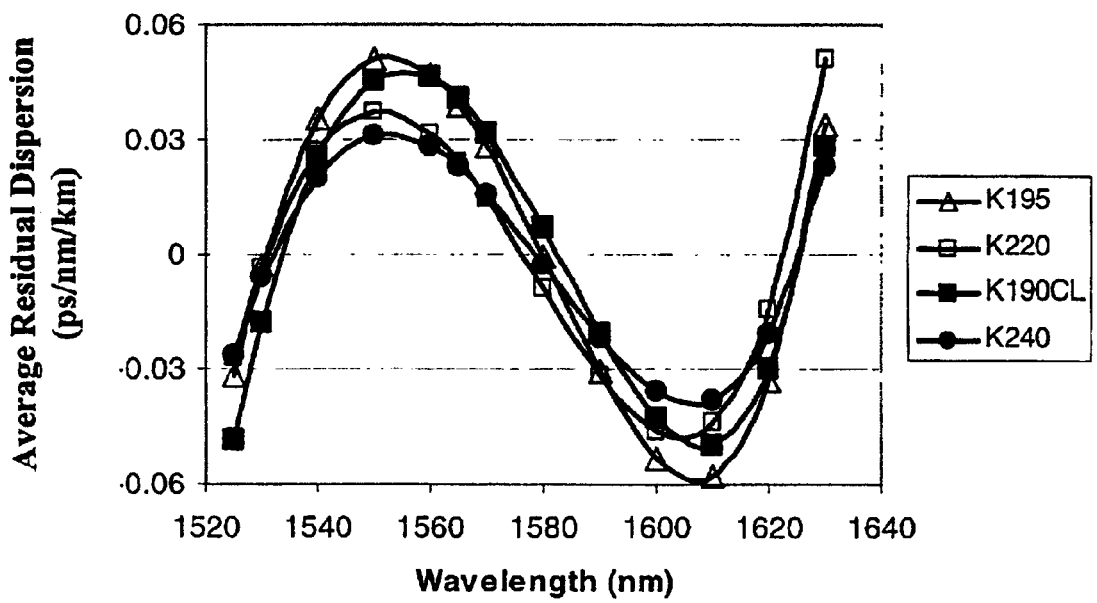

Table 5 below outlines the results for several transmission lines in accordance with the invention. The table includes the respective lengths of the DC fibers 20, and the total dispersion and dispersion slope of the transmission fiber 19 utilized in each model. Some of the examples were optimized for low residual dispersion in the S band (see FIG. 26) and included a trim fiber 32 such as shown in FIG. 27. Further, other example transmission lines including the DC fibers 20 in accordance with the invention are optimized for C, L or C+L band operation. For example, the DC fibers 20 shown in FIGS. 22 and 23 are optimized for operation in transmission lines 18 adapted to operate in the C+L bands (from 1525 to 1625 nm). These transmission lines exhibit less than 0.3 ps/nm/km High-to-Low average residual dispersion as measured from the high residual point of the plot in the wavelength range to the low residual point of the plot in the wavelength. By way of example, illustrated in FIG. 22 is a plot of the average residual dispersion of a transmission line 18 including a DC fiber 20 labeled K180-4 over the C+L band (from 1525 to 1625 nm). In that plot, the high point and the low point within the wavelength range are labeled as 52 and 54, respectively. The difference between those values is the High-to Low average residual dispersion (labeled 56), i.e., the difference between the high and low average residual dispersion values within the wavelength range for that transmission line 18. The same convention is used for determining the High-to-Low average residual dispersion for the other transmission lines herein (see examples 17–38 of Table 5).

TABLE 5

Transmission line data

| Ex. | Fig. # | Legend | Length DCF km | Dispersion @ 1550 nm ps/nm/km | Dispersion Slope of Transmission Fiber @ 1550 nm ps/nm²/km | Trim Fiber Length km | Optimized Band |
|---|---|---|---|---|---|---|---|
| 17 | 24 | K170-1 | 5.26 | 6.3 | 0.037 | 0.00 | C |
| 18 | 22 | K170-1 | 5.20 | 6.3 | 0.037 | 0.00 | C + L⁻ |

TABLE 5-continued

Transmission line data

| Ex. | Fig. # | Legend | Length DCF km | Dispersion @ 1550 nm ps/nm/km | Dispersion Slope of Transmission Fiber @ 1550 nm ps/nm²/km | Trim Fiber Length km | Optimized Band |
|---|---|---|---|---|---|---|---|
| 19 | 24 | K170-2 | 5.17 | 6.3 | 0.037 | 0.00 | C |
| 20 | 22 | K170-2 | 5.13 | 6.3 | 0.037 | 0.00 | C + L |
| 21 | 24 | K190 | 5.64 | 6.8 | 0.035 | 0.00 | C |
| 22 | 22 | K190 | 5.82 | 6.8 | 0.035 | 0.00 | C + L |
| 23 | 26 | K190 | 5.64 | 6.8 | 0.035 | 1.98 | S |
| 24 | 23 | K195 | 6.17 | 6.8 | 0.035 | 0.00 | C + L |
| 25 | 26 | K195 | 6.17 | 6.8 | 0.035 | 2.50 | S |
| 26 | 24 | K220 | 7.89 | 7.8 | 0.035 | 0.00 | C |
| 27 | 23 | K220 | 7.98 | 7.8 | 0.035 | 0.00 | C + L |
| 28 | 26 | K220 | 7.89 | 7.8 | 0.035 | 2.12 | S |
| 29 | 23 | K240 | 7.42 | 7.1 | 0.03 | 0.00 | C + L |
| 30 | 26 | K240 | 7.42 | 7.1 | 0.03 | 1.75 | S |
| 31 | 24 | K180-1 | 6.25 | 7.3 | 0.04 | 0.00 | C |
| 32 | 22 | K180-1 | 6.06 | 7.3 | 0.04 | 0.00 | C + L |
| 33 | 25 | K180-3 | 8.37 | 7.3 | 0.04 | 0.00 | L |
| 34 | 22 | K180-4 | 7.27 | 7.3 | 0.04 | 0.00 | C + L |
| 35 | 25 | K190C | 7.62 | 6.7 | 0.035 | 0.00 | C |
| 36 | 26 | K190C | 7.62 | 6.7 | 0.035 | 1.92 | S |
| 37 | 24 | K190L | 5.41 | 6.7 | 0.035 | 0.00 | L |
| 38 | 23 | K190CL | 6.22 | 6.7 | 0.035 | 0.00 | C + L |

The family of DC fibers 20 that are optimized for use in the C+L bands are shown in and 23 (see examples 18, 20, 22, 24, 27, 29, 32, 34, 38 above). In these examples, the High-to-Low average residual dispersion over the C+L band (from 1525 to 1625 nm) is less 0.25 ps/nm/km; and more preferably less than 0.12 ps/nm/km.

Figure 25:
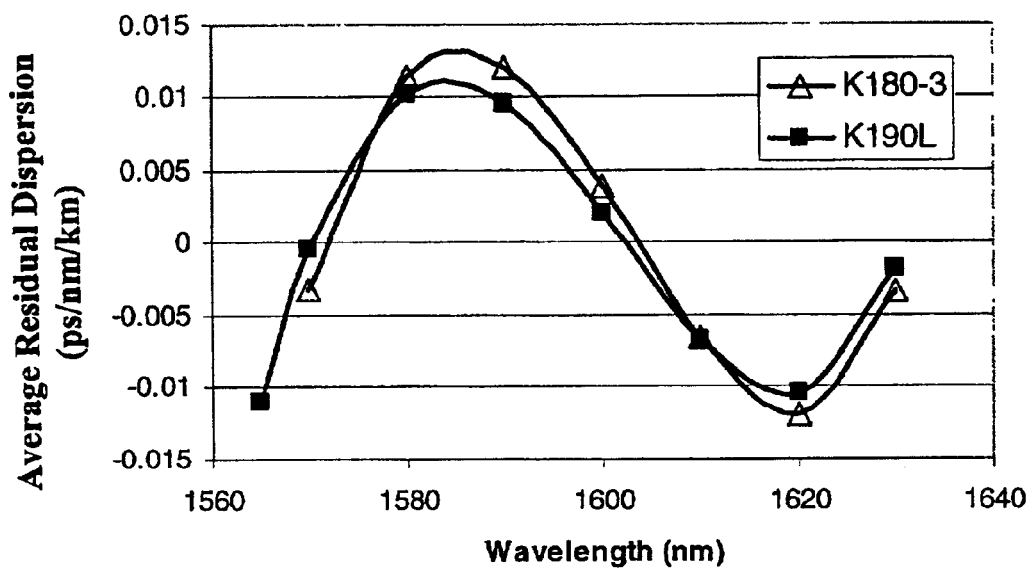

The family of DC fibers 20 that are optimized for use in the L-band are shown in FIG. 25 (see examples 33 and 37). In these examples, the High-to-Low average residual dispersion over the L band (from 1565 to 1625 nm) is less than 0.03 ps/nm/km; and more preferably less than 0.025 ps/nm/km.

Figure 24:
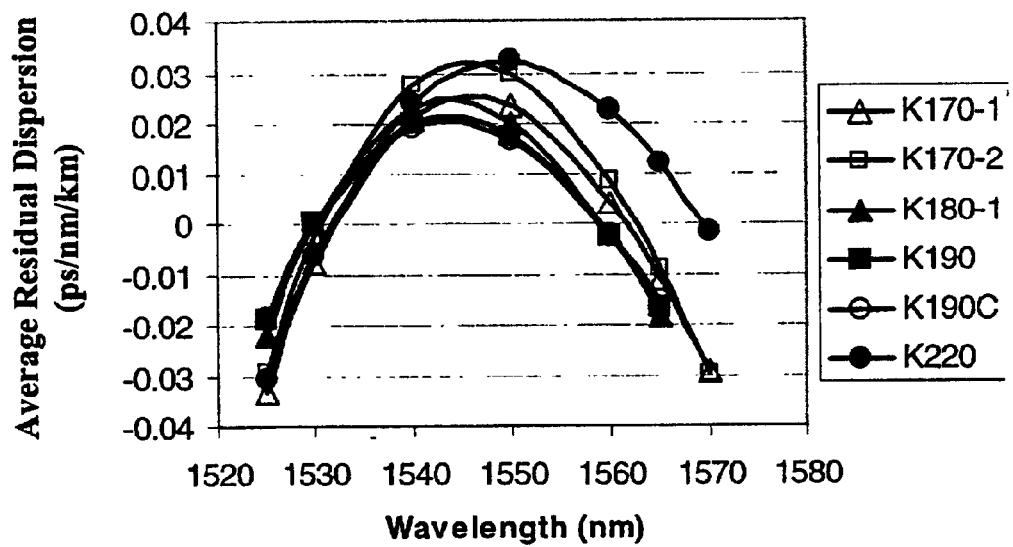

The family of DC fibers 20 that are optimized for use in the C-band are shown in FIG. 24 (see examples 17, 19, 21, 26, 31 and 35). In these examples, the High-to-Low average residual dispersion over the C-band (from 1525 to 1565 nm) is less than 0.08 ps/nm/km; and more preferably less than 0.06 ps/nm/km.

Figure 26:
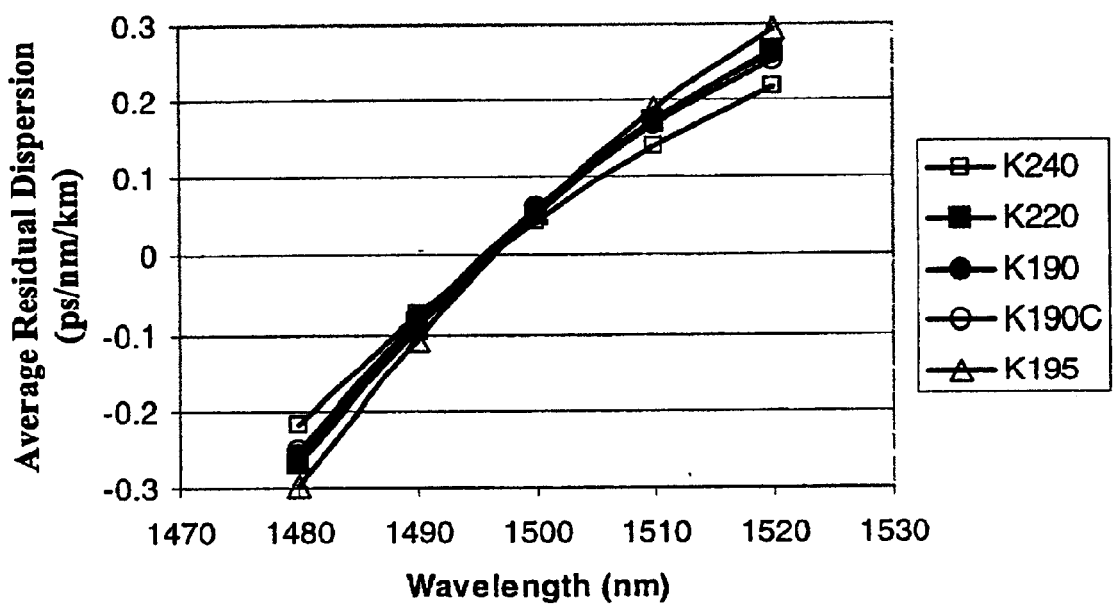

A family of DC fibers 20-optimized for use in the S-band are shown in FIG. 26 (see examples 23, 25, 28, 30, and 36). In these examples, the High-to-Low average residual dispersion over the S-band (from 1480 to 1525 nm) with trim fiber 32 is less than 0.8 ps/nm/km; and more preferably less than 0.6 ps/nm/km.

Figure 38:
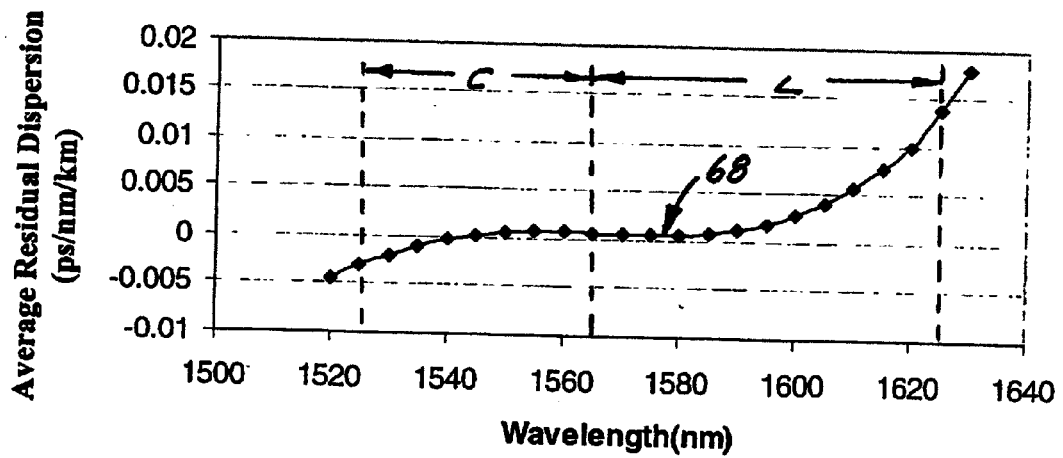
FIG. 38 is a graphic plot of residual dispersion as a function of wavelength for an experimental transmission line including an actual DC fiber in accordance with the present invention.
Figure 39:
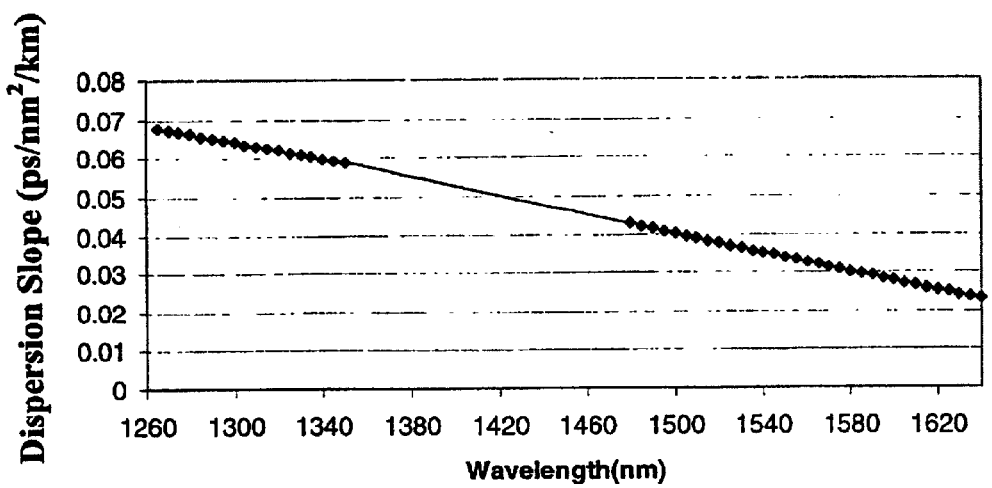
FIGS. 39–41 are graphic plots of total dispersion, dispersion slope and kappa as a function of wavelength for the transmission fiber utilized in the experimental transmission line in accordance with an embodiment of the present invention.
Figure 40:
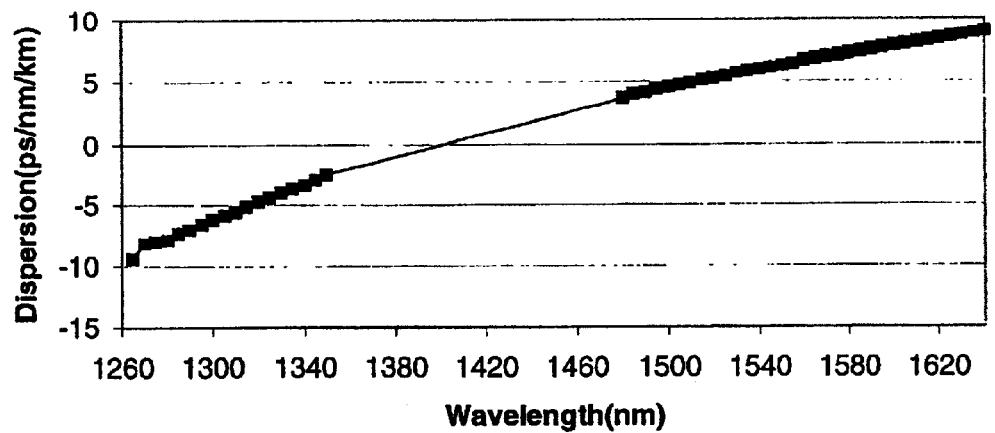
Figure 41:
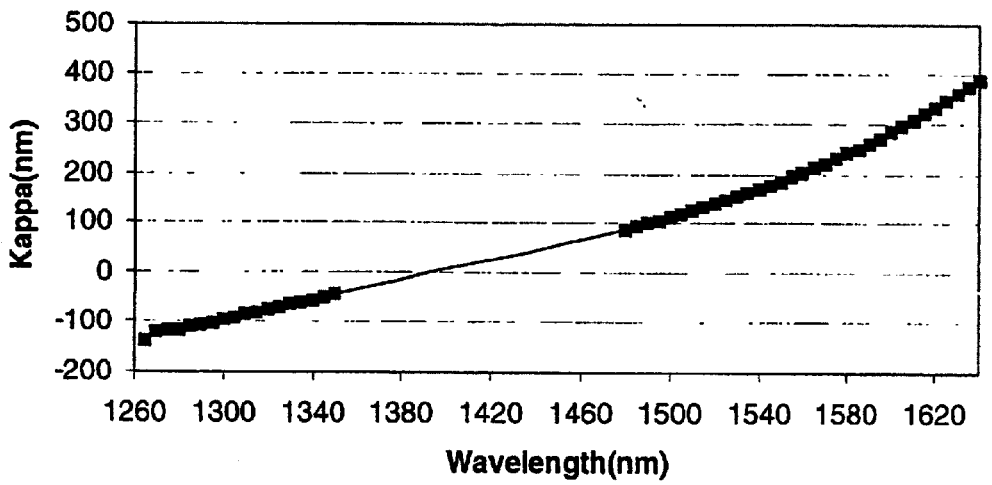

FIG. 38 illustrates a plot 68 of experimental results of average residual dispersion in ps/nm/km versus wavelength in nm of a transmission line 18 including a transmission fiber 19 and DC fiber 20 in accordance with the invention. The transmission fiber 19 had a length of 19.2 km, a total dispersion of 6.3 ps/nm/km at 1550 nm (see FIG. 40), a dispersion slope of 0.034 ps/nm²/km at 1550 nm (see FIG. 39), and a kappa of about 185 at 1550 nm (see FIG. 41). The transmission line 18 also included a DC fiber 20 in accordance with the invention outlined in Table 3 having a dispersion of −114 ps/nm/km at 1550 nm, a dispersion slope of −0.578 ps/nm²/km at 1550 nm, a kappa of 197.4 nm at 1550 nm, and a length of 1.1 km. The experimental data illustrates that the High-to-Low average residual dispersion is less than 0.01 ps/nm/n; and more preferably less than 0.006 ps/nm/km over the entire C-band (from 1525 to 1565 nm). Additionally, the High-to-Low average residual dispersion is less than 0.02 ps/nm/km; and more preferably less than 0.015 ps/nm/km over the entire L-band (from 1565 to 1625 nm). Also, the High-to-Low average residual dispersion is less than 0.025 ps/nm/km over the entire C+L band (from 1525 to 1625 nm). Thus, it should be recognized that excellent dispersion compensation in the C, L and C+L bands may be achieved in transmission lines 18 including low-slope transmission fibers (slopes less than 0.035 ps/nm²/km) when combined with the present invention DC fiber 20.

Figure 29:
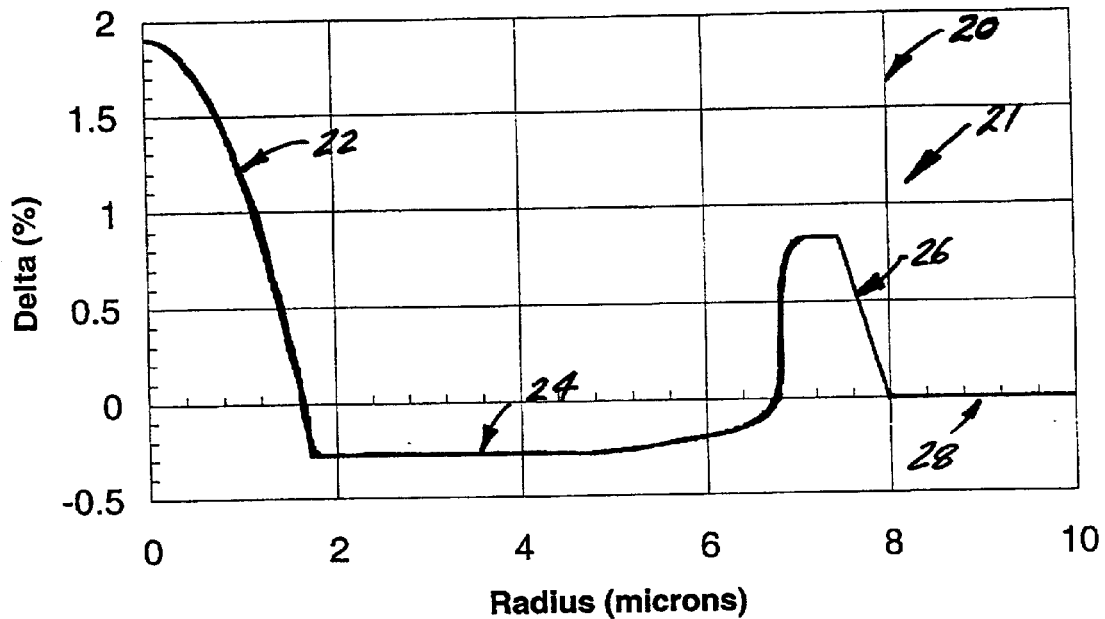
FIGS. 29 and 30 are graphic plots of refractive index profiles of other embodiments of DC fiber in accordance with the present invention.
Figure 30:
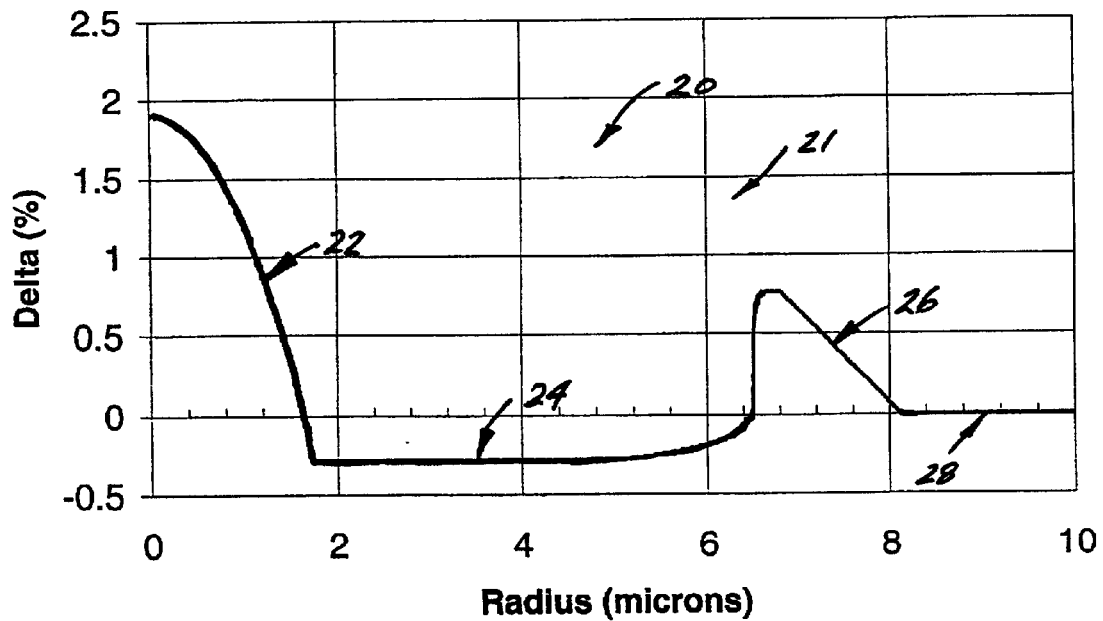
Figure 31:
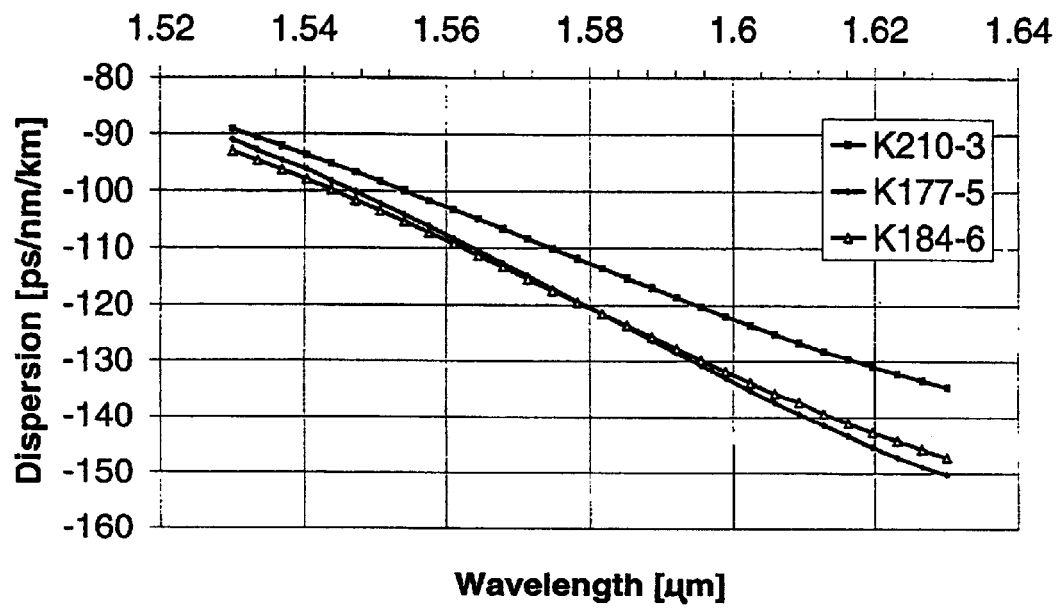
FIG. 31 is a graphic plot of total dispersion as a function of wavelength for the second group of DC fibers of FIGS. 28–30 in accordance with the present invention.
Figure 32:
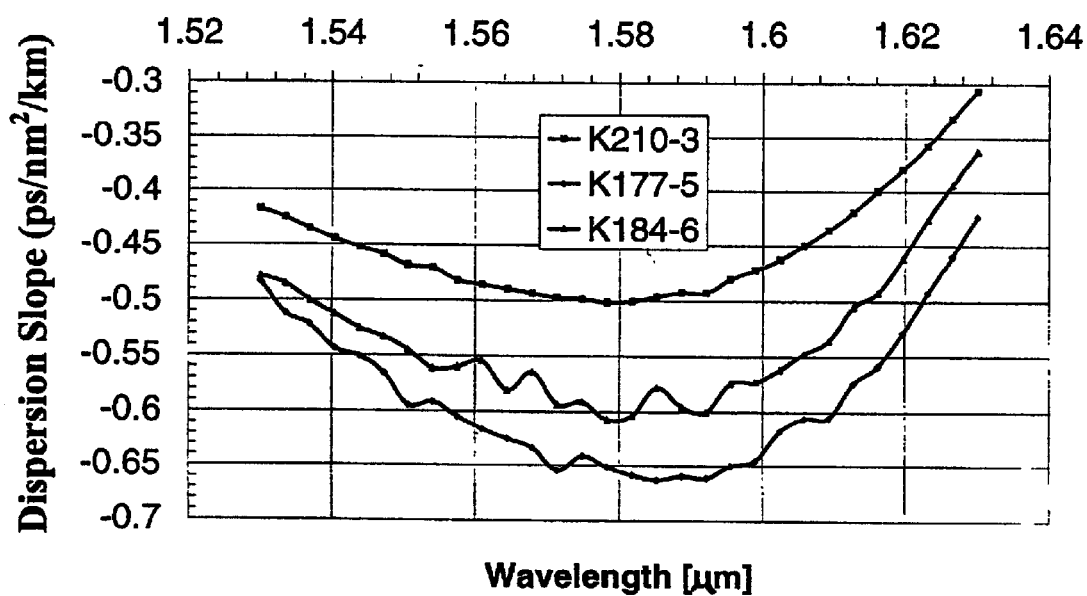
FIG. 32 is a graphic plot of dispersion slope as a function of wavelength for the second group of DC fibers in accordance with the present invention.
Figure 33:
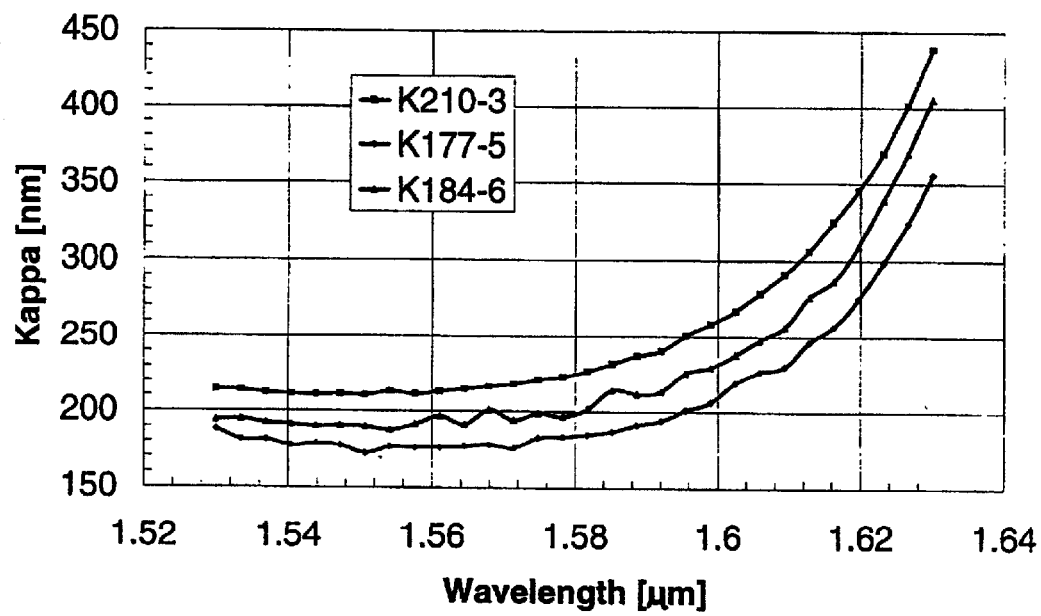
FIG. 33 is a graphic plot of kappa as a function of wavelength for the second group of DC fibers in accordance with the present invention.

A second family of DC fibers 20 in accordance with embodiments of the invention are shown in FIGS. 28–30 herein. Similar to the first DC fiber embodiments of FIGS. 3–15, the DC fibers 20 of FIGS. 28–30 include a core 21, a central core 22, a moat 24 surrounding the central core, a ring 26 surrounding the moat, and a cladding 28 surrounding the core 21. The cladding in this family is preferably also silica. The various features of this second family of DC fibers 20 are shown in Table 2. In particular, the ring 26 in this family is not offset from the moat 24, i.e., it starts at the outer edge of the moat. Further, these embodiments include a wider moat 24 than the first family and a lower core-moat ratio. The core-moat ratio for these embodiments ranges between 0.23 and 0.29.

In particular, the total dispersion for this second family of DC fibers 20 is less than −96 and greater than −130 ps/nm/km at 1550 nm; and more preferably less than −96 and greater than −125 ps/nm/km. The dispersion slope ranges between −0.35 and −0.85 ps/nm²/km. kappa ranges between 163 and 219 at 1550 nm; and more preferably between 175 and 214 nm. These fibers 20 have a refractive index profile having a core 21 with a central core 22 having a core delta (Δ1) of less than 2.2%, a moat 24 surrounding the central core 22 having a moat delta (Δ2) less than −0.65%, and a ring 26 surrounding the moat 24 having a positive ring delta (Δ3). Plots of the dispersion, dispersion slope and kappa may be found in FIGS. 31–33.

The second family of DC fibers 20 may also be utilized in transmission lines 18, 118, 218 similarly to the previous family. This family of DC fibers 20 is particularly useful for compensating for dispersion in transmission lines including transmission lines with total dispersion between 4 and 10 ps/nm/km and dispersion slope less than 0.045 ps/nm²/km;

more preferably between 0.02 and 0.045 ps/nm²/km; and more preferably less than 0.038 ps/nm²/km. The transmission fiber 19 preferably has a dispersion slope less than 0.035 ps/nm²/km over the C+L band from 1525 nm to 1625 nm. Kappa of the transmission fibers 19 is preferably between 147 and 240 nm. The transmission fiber 19 preferably includes a zero dispersion wavelength of less than 1430 nm and a cabled cutoff wavelength of less than 1260 nm. Preferably also, the transmission fiber 19 includes an effective area of less than 60 square microns. The DC fiber 20 when used in a transmission line such as line 218 preferably has a length of between 4 and 8 km; more preferably 4.6 to 7.2 km, such that Raman pumping may be employed.

Figure 34:
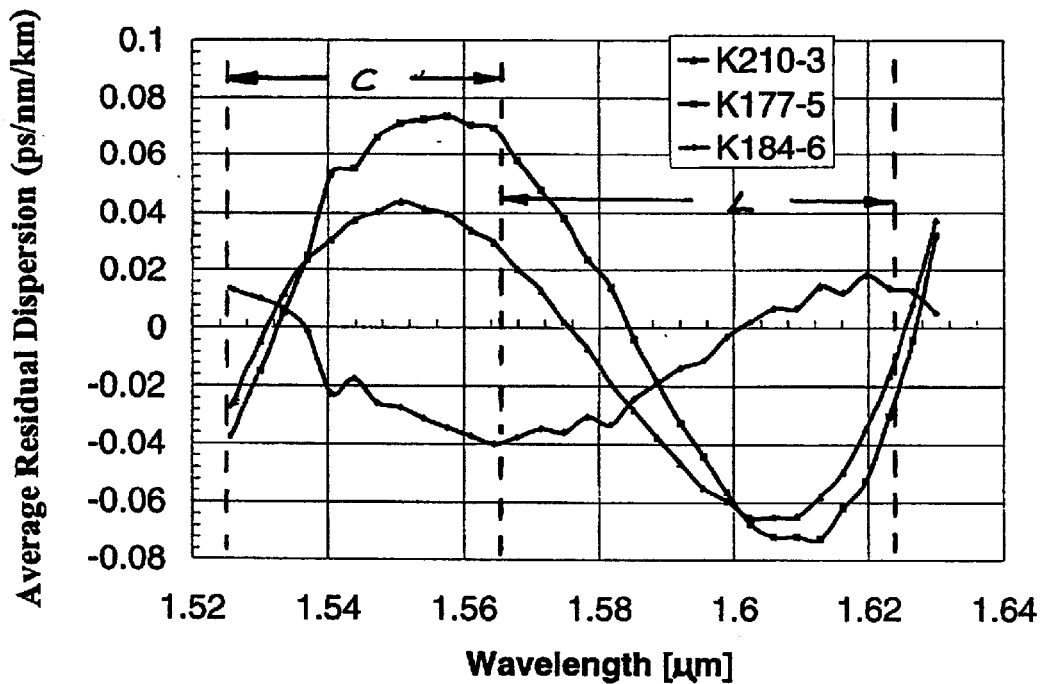
FIG. 34 is a graphic plot of residual dispersion for transmission lines including the DC fibers of FIGS. 28–30 in accordance with the present invention.
Figure 44:
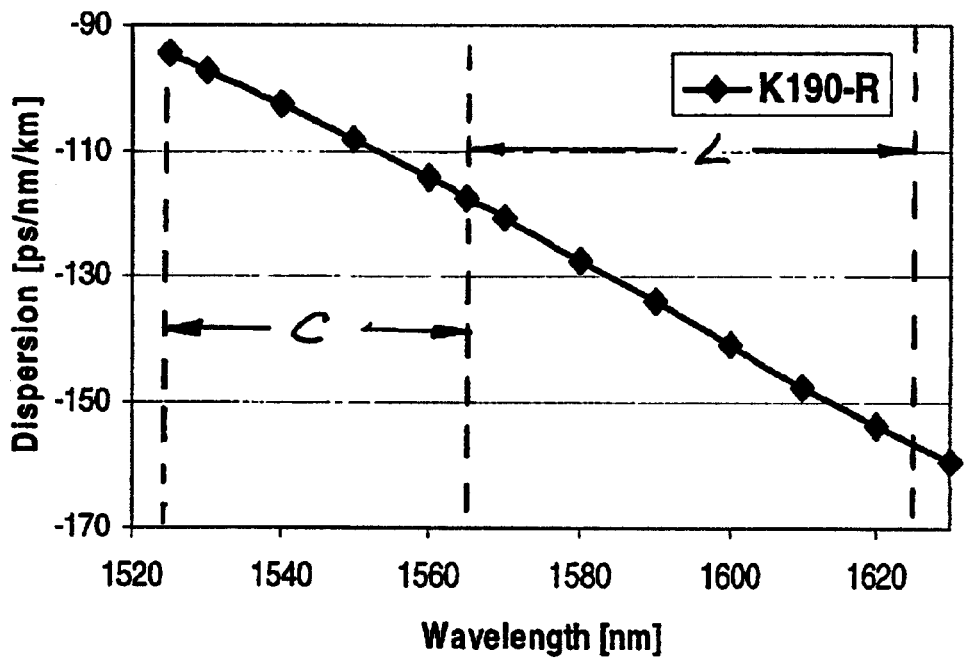
FIG. 44 is a graphic plot of total dispersion as a function of wavelength for the DC fiber of FIG. 43 in accordance with the present invention.
Figure 45:
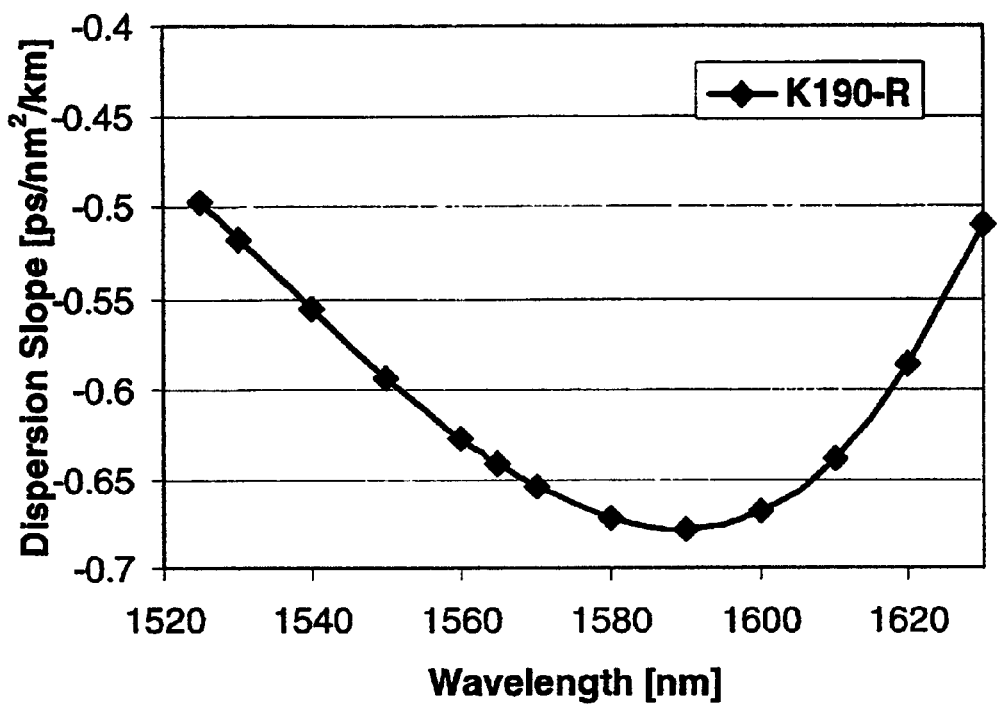
FIG. 45 is a graphic plot of dispersion slope as a function of wavelength for the DC fiber of FIG. 43 in accordance with the present invention.
Figure 46:
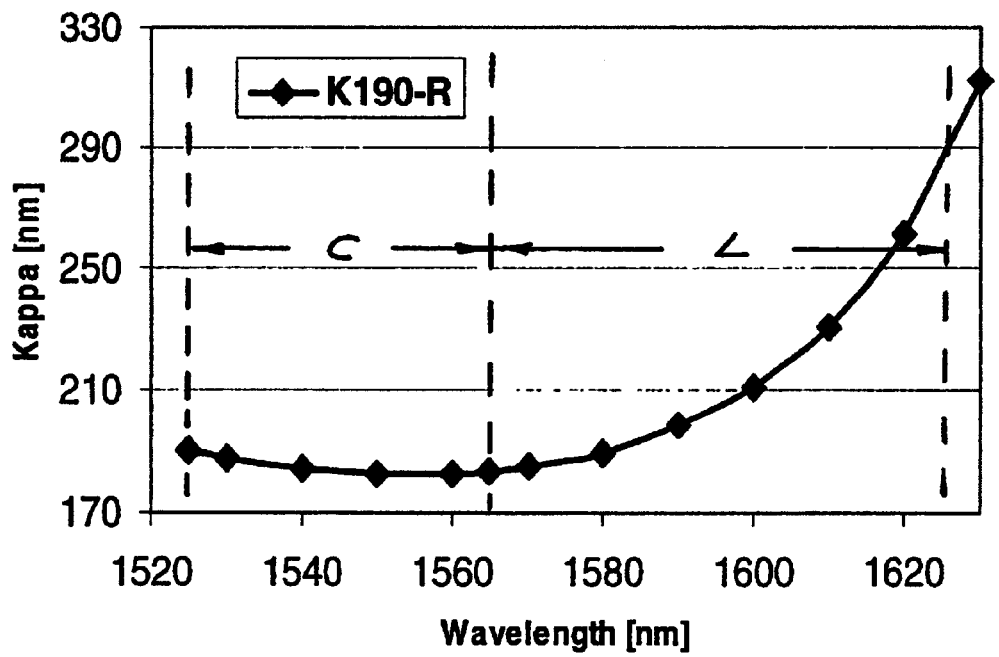
FIG. 46 is a graphic plot of kappa as a function of wavelength for the DC fiber of FIG. 43 in accordance with the present invention.
Figure 47:
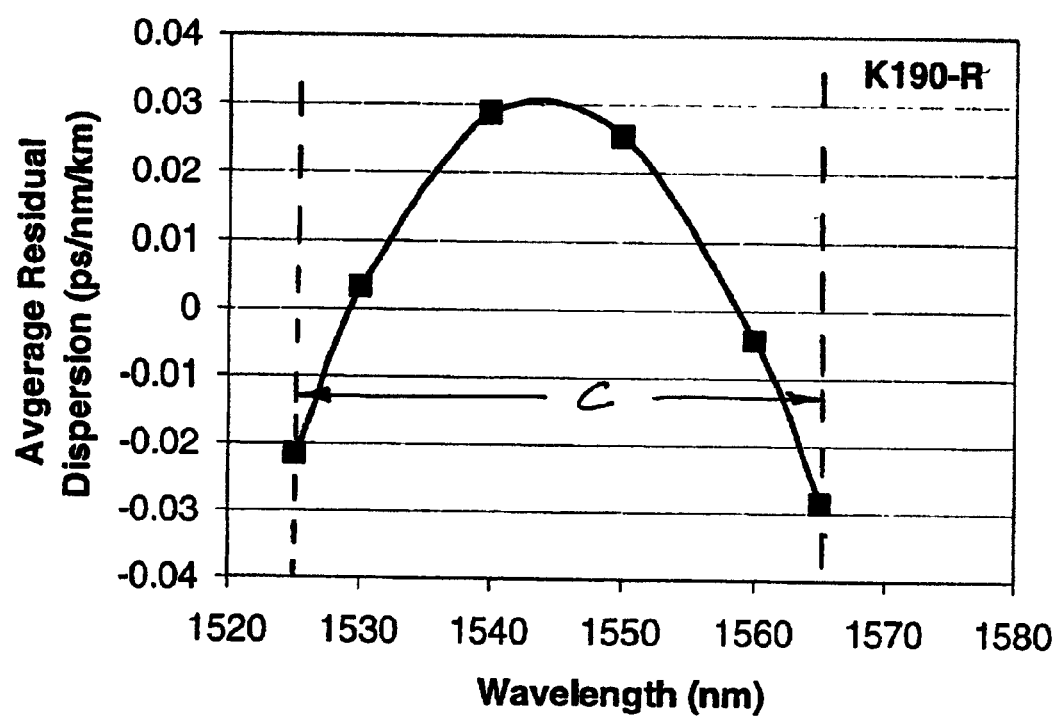
FIG. 47 is a graphic plot of residual dispersion for a transmission line including the DC fiber of FIG. 43 in accordance with the present invention.

Shown in FIG. 34 are results of average residual dispersion for several transmission lines 18 including a 100 km length of transmission fiber optically coupled to a length of DC fiber 20 in accordance with the invention. The values of dispersion, dispersion slope, and lengths used in the model for the transmission fibers 19 and DC fibers 20 for each line are shown in Table 6 below. It should be noted that for each transmission line example, different transmission fibers (TF) 19 and DC fibers (DC) 20 were employed.

second family and slightly wider than the first family of DC fibers 20, thereby resulting in core-moat ratios of about 0.32. As in the previous embodiments, the DC fiber 20 has a core 21 and cladding 28. The core 21 is segmented and includes a central core 22, a moat 24, and an offset ring 26. The dispersion, dispersion slope and kappa are shown in FIGS. 44–46. As is illustrated in FIG. 44, the dispersion varies by less than 30 ps/nm/km over the C-band range from 1525 to 1565 nm, and less than 50 ps/nm/km over the L-band from 1565 to 1625 nm. Likewise, kappa varies less than by less than 10 nm over the C-band range from 1525 to 1565 nm, and less than 110 ps/nm/km over the L-band from 1565 to 1625 nm, as shown in FIG. 46. The DC fiber 20 was modeled in a transmission line 18 having 100 km of transmission fiber 19 with a total dispersion of 6.8 ps/nm/km at 1550 nm and a dispersion slope of 0.035 ps/nm²/km at 1550 nm. The DC fiber 20 had the attributes as listed in Table 7 and a length of 6.14 km. The modeled average residual dispersion is illustrated in FIG. 47. The High-to-Low average residual dispersion over the C-band from 1525 to 1565 nm is less than 0.08 ps/nm/km; and more preferably less than 0.06 ps/nm/km.

TABLE 6

Transmission line data

| Ex. | Legend | DC Length km | DC Disp. ps/nm/km @ 1550 nm | DC Slope ps/nm²/km @ 1550 nm | DC Kappa nm @ 1550 nm | TF Disp. ps/nm/km @ 1550 nm | TF Slope ps/nm²/km @ 1550 nm | TF Kappa nm @ 1550 nm |
|---|---|---|---|---|---|---|---|---|
| 39 | K210-3 | 6.37 | −98 | −0.47 | 210 | 6.29 | 0.030 | 210 |
| 40 | K177-5 | 6.31 | −102 | −0.57 | 177 | 6.52 | 0.038 | 172 |
| 41 | K184-6 | 7.06 | −103 | −0.56 | 184 | 7.32 | 0.040 | 183 |

TABLE 7

Dispersion compensation fiber example

| Ex. | Legend | Dispersion ps/nm/km | Slope ps/nm²/km | Kappa nm | Δ1 % | Δ2 % | Δ3 % | R1 μm | R2 μm | R3 μm | Ring Width μm | C/M Ratio | Pin Array dB | Lateral Load dB/m | Aeff μm² | λc nm |
|---|---|---|---|---|---|---|---|---|---|---|---|---|---|---|---|---|
| 42 | K190-R | −111 | −0.60 | 185 | 1.85 | −0.40 | 0.33 | 1.66 | 5.10 | 8.45 | 2.25 | 0.32 | 0.70 | 0.68 | 17.2 | 1670 |

FIG. 34 illustrates that the modeled High-to-Low average residual dispersion for the transmission lines 18 of Table 6 over an entire C+L band having a wavelength range from 1525 nm to 1625 nm is less than 0.2 ps/nm/km; and more preferably less than 0.12 ps/nm/km. The modeled High-to-Low average residual dispersion for the transmission line 18 over an entire C-band having a wavelength range from 1525 nm to 1565 nm is less than 0.012 ps/nm/km; and more preferably less than 0.08 ps/nm/km. The modeled High-to-Low average residual dispersion for the transmission line 18 over an entire L-band having a wavelength range from 1565 nm to 1625 nm is less than 0.16 ps/nm/km; and more preferably less than 0.12 ps/nm/km.

Figure 43:
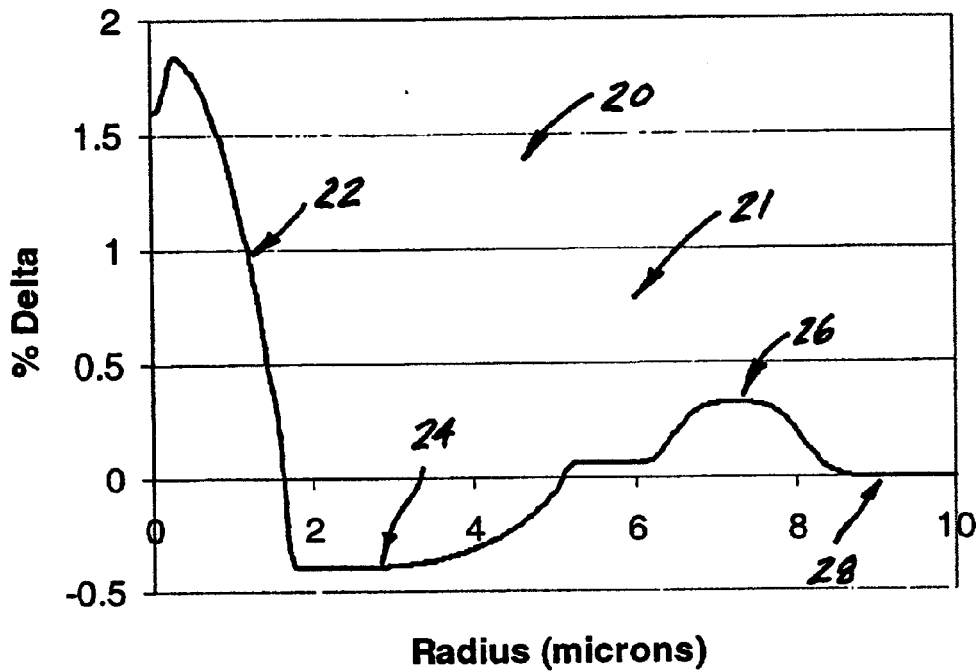
FIGS. 43 is a graphic plot of a refractive index profile of another embodiment of DC fiber in accordance with the present invention.

A refractive index profile of another embodiment of DC fiber 20 in accordance with the present invention is illustrated in FIG. 43. This embodiment is different from those above in that the moat 24 is slightly narrower than the The DC fibers 20 in accordance with them present invention may be drawn from optical fiber preforms utilizing conventional draw methods and apparatus. The optical fiber preform used to draw the present invention DC fibers 20 from may be manufactured in accordance with any known method, such as any known chemical vapor deposition method. Chemical vapor deposition methods include OVD, MCVD, PCVD or the like. Most preferably, the DC fiber preform may be manufactured by an OVD method wherein the preform portion corresponding to the central core segment 22 is first manufactured by depositing silicon oxide soot doped with germania oxide onto a rotating tapered alumina mandrel to a desired diameter. The soot is doped with the appropriate level of germania dopant to achieve the desired refractive index profile for the central core segment including the appropriate $\Delta_1\%$. The mandrel is then removed and the soot preform constituting the central core segment 22 is thoroughly dried in a preferably helium and chlorine containing environment and then consolidated in a consolidating furnace including a helium atmosphere. The consolidated central core blank is then redrawn into a single-segment core cane of 9 to 11 mm in diameter. During the redraw process, the centerline aperture resulting from removal of the mandrel is closed through the application of a vacuum or by other known methods.

Redrawn single-segment core cane then becomes the target deposition surface for the application of further soot to form the preform portion corresponding to the moat segment 24. Silica soot is deposited onto the cane to an appropriate diameter for the moat and is then preferably dried within a consolidation furnace within a helium- and chlorine-containing atmosphere in a consolidation furnace. The soot preform is then doped with a suitable fluorine-containing gas, such as $C_2F_6$, $C_2F_2Cl_2$, $CF_4$, $SF_6$, or $SiF_4$, or the like, and subsequently consolidated and again redrawn into a two-segment core cane. U.S. Pat. No. 4,629,485 to Berkey describes one such method for fluorine doping an optical fiber preform.

This two-segment core cane material now becomes the deposition surface for the preform portion corresponding to the ring segment 26. Germania-doped silica soot is next deposited on the two-segment cane and is subsequently dried and consolidated as herein before described. Again, the consolidated blank is redrawn and this time becomes the final core cane including three segments corresponding to the three segments 22, 24, 26 of the segmented core. Additional silica soot that comprises the cladding 28 is then deposited on the final core cane to form the overclad soot blank. The overclad soot blank is dried and consolidated and subsequently transferred to a draw furnace where the present invention DC fiber is drawn therefrom.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A dispersion compensation fiber, comprising:
   a refractive index profile including a core having
   a central core having a core delta ($\Delta 1$) having a value greater than 1.5%,
   a moat surrounding the central core having a moat delta ($\Delta 2$) having a value less negative than –0.65%, and
   a ring surrounding the moat having a positive ring delta ($\Delta 3$),
   the refractive index profile being selected to provide a total dispersion less than –87 and greater than –167 ps/nm/km at 1550 nm; a dispersion slope more negative than –0.30 ps/nm²/km at 1550 nm; and a kappa value defined as the total dispersion at 1550 nm divided by the dispersion
   slope at 1550 nm of greater than 151 and less than 244 nm, and a core-moat ratio, defined as a radius (R1) to the outer edge of the central core divided
   by a radius (R2) to the outer edge of the moat, of greater than 0.31.

2. The dispersion compensation fiber of claim 1 wherein the dispersion varies less than 75 ps/nm/km over a range from 1525 to 1625 nm.

3. The dispersion compensation fiber of claim 2 wherein the dispersion varies less than 50 ps/nm/km over a range from 1525 to 1625 nm.

4. The dispersion compensation fiber of claim 1 further comprising total dispersion at 1550 nm less than –96 and greater than –150 ps/nm/km.

5. The dispersion compensation fiber of claim 4 further comprising total dispersion at 1550 nm less than –96 and greater than –125 ps/nm/km.

6. The dispersion compensation fiber of claim 5 further comprising total dispersion at 1550 nm less than –100 and greater than –120 ps/nm/km.

7. The dispersion compensation fiber of claim 1 further comprising dispersion slope less than –0.30 and greater than –1.3 ps/nm²/km at 1550 nm.

8. The dispersion compensation fiber of claim 7 further comprising dispersion slope less than –0.35 and greater than –0.85 ps/nm²/km at 1550 nm.

9. The dispersion compensation fiber of claim 1 further comprising kappa greater than 156 and less than 244 nm at 1550 nm.

10. The dispersion compensation fiber of claim 9 further comprising kappa greater than 163 and less than 219 at 1550 nm.

11. The dispersion compensation fiber of claim 10 further comprising kappa greater than 175 and less than 214 at 1550 nm.

12. The dispersion compensation fiber of claim 1 wherein kappa varies between 150 and 350 nm over a wavelength range from 1525 to 1625 nm.

13. The dispersion compensation fiber of claim 1 wherein kappa varies less than 100 nm over a wavelength range from 1525 to 1625 nm.

14. The dispersion compensation fiber of claim 13 wherein kappa varies less than 75 nm over a wavelength range from 1525 to 1625 nm.

15. The dispersion compensation fiber of claim 1 further comprising an effective area at 1550 nm of greater than 15 square microns.

16. The dispersion compensation fiber of claim 1 further comprising a pin array bend loss of less than 5.5 dB at 1550 nm.

17. The dispersion compensation fiber of claim 16 further comprising a pin array bend loss of less than 4.0 dB at 1550 nm.

18. The dispersion compensation fiber of claim 1 further comprising a lateral load micro-bend measurement of less than 1.0 dB/m.

19. The dispersion compensation fiber of claim 18 further comprising a lateral load micro-bend measurement of less than 0.5 dB/m.

20. The dispersion compensation fiber of claim 1 further comprising an attenuation of less than 0.5 dB/km at 1550 nm.

21. The dispersion compensation fiber of claim 1 further comprising a measured fiber cutoff wavelength of less than 1500 nm.

22. The dispersion compensation fiber of claim 1 further comprising a measured cabled cutoff wavelength of less than 1500 nm.

23. The dispersion compensation fiber of claim 1 wherein the core-moat ratio is greater than 0.35 and less than 0.40.

24. The dispersion compensation fiber of claim 1 wherein the core delta ($\Delta 1$) is greater than 1.5% and less than 2.0%.

25. The dispersion compensation fiber of claim 24 wherein an outer core radius (R1) of the central core is between about 1.52 and 1.93 microns.

26. The dispersion compensation fiber of claim 25 wherein the outer core radius (R1) is between about 1.65 and 1.75 microns.

27. The dispersion compensation fiber of claim 24 wherein the moat delta ($\Delta 2$) is between –0.35% and –0.65%.

28. The dispersion compensation fiber of claim 27 wherein the moat delta ($\Delta 2$) is between –0.35% and –0.55%.

29. The dispersion compensation fiber of claim 27 wherein a moat radius (R2) of the moat is less than 5.0 microns from a centerline of the dispersion compensation fiber.

30. The dispersion compensation fiber of claim 29 wherein the moat radius (R2) is between about 4.0 and 5.0 microns from the centerline.

31. The dispersion compensation fiber of claim 30 wherein the moat radius (R2) is between about 4.25 and 4.75 microns from the centerline.

32. The dispersion compensation fiber of claim 29 wherein the core-moat ratio is greater than 0.35 and less than 0.40.

33. The dispersion compensation fiber of claim 32 wherein the core-moat ratio is greater than 0.37 and less than 0.39.

34. The dispersion compensation fiber of claim 24 wherein the ring delta (Δ3) is between about 0.35 and 0.52%.

35. The dispersion compensation fiber of claim 34 wherein the ring radius (R3) is between about 6.4 and 8.3 microns.

36. The dispersion compensation fiber of claim 35 wherein the ring width (W) is between about 1.1 to 1.5 microns.

37. An optical transmission line, wherein the dispersion compensation fiber as set forth in any one of the claims 1 through 36 is optically connected to a transmission fiber having:
   a total dispersion between 4 and 10 ps/nm/km at a wavelength of 1550 nm, and
   a positive dispersion slope of less than 0.045 ps/nm$^2$/km at a wavelength of 1550 nm.

38. The optical transmission line of claim 37 wherein the transmission fiber has a positive dispersion slope of less than 0.038 ps/nm$^2$/km at a wavelength of 1550 nm.

39. The optical transmission line of claim 38 wherein the dispersion compensation fiber has a length of between 4 and 8 km.

40. The optical transmission line of claim 39 wherein the dispersion compensation fiber has a length of between 4.6 and 7.2 km.

41. The optical transmission line of claim 39 further comprising a Raman pump.

42. The optical transmission line of claim 37 wherein the transmission fiber has a zero dispersion wavelength of less than 1430 nm.

43. The optical transmission line of claim 37 wherein the transmission fiber has a cabled cutoff of less than 1260 nm.

44. The optical transmission line of claim 37 wherein the transmission fiber comprises an effective area less than 60 μm$^2$ at a wavelength of 1550 nm.

45. The optical transmission line of claim 37 wherein the transmission fiber comprises a dispersion slope between 0.020 and 0.045 ps/nm$^2$/km.

46. The optical transmission line of claim 37 wherein the transmission fiber comprises a kappa value defined as total dispersion at a wavelength of 1550 nm divided by dispersion slope at a wavelength of 1550 nm of between 147 and 240 nm.

47. The optical transmission line of claim 37 wherein the transmission fiber comprises a dispersion slope of less than 0.035 ps/nm$^2$/km in a wavelength band from 1525 nm to 1625 nm.

48. The optical transmission line of claim 37 wherein a High-to-Low average residual dispersion for the transmission line over an entire C+L band having a wavelength range from 1525 nm to 1625 nm is less than 0.3 ps/nm/km.

49. The optical transmission line of claim 48 wherein the High-to-Low average residual dispersion is less than 0.12 ps/nm/km.

50. The optical transmission line of claim 37 wherein a High-to-Low average residual dispersion for the transmission line over an entire C-band having a wavelength range from 1525 nm to 1565 nm is less than 0.08 ps/nm/km.

51. The optical transmission line of claim 50 wherein the High-to-Low average residual dispersion is less than 0.02 ps/nm/km.

52. The optical transmission line of claim 51 wherein the High-to-Low average residual dispersion is less than 0.01 ps/nm/km.

53. The optical transmission line of claim 37 wherein a High-to-Low average residual dispersion for the transmission line over an entire L-band having a wavelength range from 1565 nm to 1625 nm is less than 0.12 ps/nm/km.

54. The optical transmission line of claim 53 wherein the High-to-Low average residual dispersion is less than 0.03 ps/nm/km.

55. The optical transmission line of claim 54 wherein the High-to-Low average residual dispersion is less than 0.02 ps/nm/km.

56. The optical transmission line of claim 37 wherein a high-to-low average residual dispersion for the transmission line over an entire S-band having a wavelength range from 1480 nm to 1525 nm is less than 0.8 ps/nm/km.

57. An optical transmission line, comprising:
   a transmission fiber with a total dispersion between 4 and 10 ps/nm/km at a wavelength of 1550 nm, and a positive dispersion slope of less than 0.038 ps/nm$^2$/km at a wavelength of 1550 nm, and
   a dispersion compensation fiber optically connected to the transmission fiber, the dispersion compensation fiber having a refractive index profile including a core with
      a central core having a core delta (Δ1) having a value greater than 1.5%,
      a moat surrounding the central core having a moat delta (Δ2) having a value less negative than −0.65%, and
      a ring surrounding the moat having a positive ring delta (Δ3),
   the refractive index profile of the dispersion compensation fiber selected to provide
      a total dispersion less than −87 and greater than −167 ps/nm$^2$/km at 1550 nm;
      a dispersion slope more negative than −0.30 ps/nm$^2$/km at 1550 nm; and
      a kappa value defined as the total dispersion at 1550 nm divided by the dispersion slope at 1550 nm of greater than 151 and less than 244 nm, and
      a core-moat ratio, defined as a radius (R1) to the outer edge of the central core divided by a radius (R2) to the outer edge of the moat, of greater than 0.31.

58. The optical transmission line of claim 57 wherein the dispersion compensation fiber has a length of between 4 and 8 km.

59. The optical transmission line of claim 58 wherein the dispersion compensation fiber has a length of between 4.6 and 7.2 km.

60. The optical transmission line of claim 58 further comprising a Raman pump.

61. The optical transmission line of claim 57 wherein the transmission fiber has a zero dispersion wavelength of less than 1430 nm.

62. The optical transmission line of claim 57 wherein the transmission fiber has a cabled cutoff of less than 1260 nm.

63. The optical transmission line of claim 57 wherein the transmission fiber comprises an effective area less than 60 μm$^2$ at a wavelength of 1550 nm.

64. The optical transmission line of claim 57 wherein the transmission fiber comprises a dispersion slope between 0.020 and 0.038 ps/nm$^2$/km.

65. The optical transmission line of claim 57 wherein the transmission fiber comprises a kappa value defined as total dispersion at a wavelength of 1550 nm divided by dispersion slope at a wavelength of 1550 nm of between 147 and 240 nm.

66. A dispersion compensation fiber, comprising:
a refractive index profile having a core with
a central core having a core delta (Δ1) of greater than 1.5% and less than 2.2%, and a core radius (R1) of the central core between 1.52 and 1.93 microns,
a moat surrounding the central core having a moat delta (Δ2) of less than −0.35% and greater than −0.65%, and a moat radius (R2) of the moat between 4.0 and 5.4 microns, and
a ring surrounding the moat having a positive ring delta (Δ3),
wherein the refractive index profile is selected to provide
a total dispersion more negative than −87 and less negative than −167 ps/nm/km at 1550 nm;
a dispersion slope is more negative than −0.35 and less negative than −0.85 ps/nm$^2$/km at 1550 nm; and
kappa defined as the total dispersion at 1550 nm divided by the dispersion slope at 1550 nm of greater than 151 and less than 244 nm.

67. The dispersion compensation fiber of claim 66 wherein kappa at 1550 nm is greater than 163 and less than 219 nm.

68. The dispersion compensation fiber of claim 66 wherein total dispersion at 1550 nm is less than −96 and greater than −145 ps/nm/km.

69. The dispersion compensation fiber of claim 68 wherein total dispersion at 1550 nm is less than −96 and greater than −125 ps/nm/km.

70. The dispersion compensation fiber of claim 66 wherein a core-moat ratio, defined as the core radius (R1) divided by the moat radius (R2), of greater than 0.31.

71. The dispersion compensation fiber of claim 70 wherein the core-moat ratio is greater than 0.35.

72. The dispersion compensation fiber of claim 70 wherein a core-moat ratio is less than 0.4.

73. A dispersion compensation fiber, comprising:
a refractive index profile having a core with
a central core having a core delta (Δ1) of less than 2.2%,
a moat surrounding the central core having a moat delta (Δ2) less than −0.65%, and
a ring surrounding the moat having a positive ring delta (Δ3),
the refractive index profile selected to provide
a total dispersion less than −96 and greater than −130 ps/nm/km at 1550 nm;
a dispersion slope more negative than −0.35 and less negative than −0.85 ps/nm$^2$/km at 1550 nm; and
kappa, defined as the total dispersion at 1550 nm divided by the dispersion slope at 1550 nm, of greater than 163 and less than 219 nm.

74. The dispersion compensation fiber of claim 73 wherein a core-moat ratio, defined as a radius (R1) to the outer edge of the central core divided by a radius (R2) to the outer edge of the moat, of greater than 0.35 and less than 0.4.

75. The dispersion compensation fiber of claim 73 wherein a core-moat ratio, defined as a radius (R1) to the outer edge of the central core divided by a radius (R2) to the outer edge of the moat, of greater than 0.23 and less than 0.29.

76. The dispersion compensation fiber of claim 73 wherein kappa at 1550 nm is greater than 175 and less than 214 nm.

77. The dispersion compensation fiber of claim 73 wherein total dispersion at 1550 nm is less than −96 and greater than −125 ps/nm/km.

78. An optical transmission line, wherein the dispersion compensation fiber as set forth in any one of the claims 73 through 77 is optically connected to a transmission fiber having:
a total dispersion between 4 and 10 ps/nm/km at a wavelength of 1550 nm, and
a positive dispersion slope of less than 0.045 ps/nm$^2$/km at a wavelength of 1550 nm.

79. The optical transmission line of claim 78 wherein the transmission fiber has a positive dispersion slope of less than 0.038 ps/nm$^2$/km at a wavelength of 1550 nm.

80. The optical transmission line of claim 78 wherein the dispersion compensation fiber has a length of between 4 and 8 km.

81. The optical transmission line of claim 80 wherein the dispersion compensation fiber has a length of between 4.6 and 7.2 km.

82. The optical transmission line of claim 80 further comprising a Raman pump.

83. The optical transmission line of claim 78 wherein the transmission fiber has a zero dispersion wavelength of less than 1430 nm.

84. The optical transmission line of claim 78 wherein the transmission fiber has a cabled cutoff of less than 1260 nm.

85. The optical transmission line of claim 78 wherein the transmission fiber comprises an effective area less than 60 μm$^2$ at a wavelength of 1550 nm.

86. The optical transmission line of claim 78 wherein the transmission fiber comprises a dispersion slope between 0.020 and 0.045 ps/nm$^2$/km at 1550 nm.

87. The optical transmission line of claim 78 wherein the transmission fiber comprises a kappa value defined as total dispersion at a wavelength of 1550 nm divided by dispersion slope at a wavelength of 1550 nm of between 147 and 240 nm.

88. The optical transmission line of claim 78 wherein the transmission fiber comprises a dispersion slope of less than 0.035 ps/nm$^2$/km in a wavelength band from 1525 nm to 1625 nm.

89. The optical transmission line of claim 78 wherein a High-to-Low average residual dispersion for the transmission line over an entire C+L band having a wavelength range from 1525 nm to 1625 nm is less than 0.3 ps/nm/km.

90. The optical transmission line of claim 89 wherein the High-to-Low average residual dispersion is less than 0.12 ps/nm/km.

91. The optical transmission line of claim 78 wherein a High-to-Low average residual dispersion for the transmission line over an entire C-band having a wavelength range from 1525 nm to 1565 nm is less than 0.08 ps/nm/km.

92. The optical transmission line of claim 91 wherein the High-to-Low average residual dispersion is less than 0.02 ps/nm/km.

93. The optical transmission line of claim 92 wherein the High-to-Low average residual dispersion is less than 0.01 ps/nm/km.

94. The optical transmission line of claim 78 wherein a High-to-Low average residual dispersion for the transmission line over an entire L-band having a wavelength range from 1565 nm to 1625 nm is less than 0.12 ps/nm/km.

95. The optical transmission line of claim 94 wherein the High-to-Low average residual dispersion is less than 0.03 ps/nm/km.

96. The optical transmission line of claim 78 wherein a High-to-Low average residual dispersion for the transmission line over an entire S-band having a wavelength range from 1480 nm to 1525 nm is less than 0.8 ps/nm/km.

97. An optical transmission line, comprising:
- a transmission fiber having
  - a total dispersion between 4 and 10 ps/nm/km at a wavelength of 1550 nm, and
  - a positive dispersion slope of less than 0.045 ps/nm$^2$/km at a wavelength of 1550 nm,
- a dispersion compensation fiber having a length between 4 and 8 km optically coupled to the transmission fiber including a refractive index profile with a core having
  - a central core having a core delta ($\Delta 1$) of less than 2.2%,
  - a moat surrounding the central core having a moat delta ($\Delta 2$) less than −0.65%, and
  - a ring surrounding the moat having a positive ring delta ($\Delta 3$),
  - the refractive index profile of the dispersion compensation fiber selected to provide total dispersion less than −96 and greater than −130 ps/nm/km at 1550 nm;
  - dispersion slope more negative than −0.35 and less negative than −0.85 ps/nm$^2$/km at 1550 nm; and
  - kappa, defined as the total dispersion at 1550 nm divided by the dispersion slope at 1550 nm, of greater than 163 and less than 219 nm, and
- a Raman pump optically coupled to the dispersion compensation fiber.

* * * * *